(12) United States Patent (10) Patent No.: US 12,621,095 B2
Go et al. (45) Date of Patent: May 5, 2026

(54) METHOD AND DEVICE FOR TRANSMITTING OR RECEIVING SOUNDING REFERENCE SIGNAL IN WIRELESS COMMUNICATION SYSTEM

(71) Applicant: LG Electronics Inc., Seoul (KR)

(72) Inventors: Seongwon Go, Seoul (KR); Suckchel Yang, Seoul (KR); Jiwon Kang, Seoul (KR); Seonwook Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 500 days.

(21) Appl. No.: 18/009,195

(22) PCT Filed: Jun. 4, 2021

(86) PCT No.: PCT/KR2021/007029
§ 371 (c)(1),
(2) Date: Dec. 8, 2022

(87) PCT Pub. No.: WO2021/251693
PCT Pub. Date: Dec. 16, 2021

(65) Prior Publication Data
US 2023/0216632 A1 Jul. 6, 2023

(30) Foreign Application Priority Data

Jun. 9, 2020 (KR) ........................ 10-2020-0069562

(51) Int. Cl.
H04L 5/00 (2006.01)
H04W 72/0457 (2023.01)
(Continued)

(52) U.S. Cl.
CPC ....... H04L 5/0048 (2013.01); H04W 72/0457 (2023.01); H04W 72/232 (2023.01); H04W 74/0808 (2013.01)

(58) Field of Classification Search
CPC ... H04L 5/0048; H04L 5/0044; H04L 5/0094; H04L 5/0051; H04W 72/0457; H04W 72/232; H04W 74/0808; H04W 72/1268
(Continued)

(56) References Cited

U.S. PATENT DOCUMENTS

2015/0055583 A1* 2/2015 Lunttila ................ H04L 5/0051
370/329
2016/0088614 A1* 3/2016 Noh ........................ H04L 5/001
370/329
(Continued)

FOREIGN PATENT DOCUMENTS

KR 20100123654 11/2010
KR 20110126034 11/2011
(Continued)

OTHER PUBLICATIONS

Ericsson, "PDCCH Enhancements for NR URLLC," R1-1911945, Presented at 3GPP TSG-RAN WG1 Meeting #99, Reno, USA, Nov. 18-22, 2019, 29 pages.
(Continued)

*Primary Examiner* — Rownak Islam
(74) *Attorney, Agent, or Firm* — Fish & Richardson P.C.

(57) ABSTRACT

Disclosed are a method and a device for transmitting or receiving a sounding reference signal (SRS) in a wireless communication system. A method for transmitting a sounding reference signal (SRS) according to an embodiment of the present disclosure may comprise the steps of: receiving, from a base station, downlink control information (DCI) for scheduling a physical uplink shared channel (PUSCH) and triggering transmission of the SRS; and transmitting the PUSCH and the SRS to the base station on the basis of the DCI. A transmission bandwidth of the SRS may be deter-
(Continued)

mined on the basis of frequency resource allocation information for transmission of the PUSCH.

16 Claims, 12 Drawing Sheets

(51) Int. Cl.
    *H04W 72/232*     (2023.01)
    *H04W 74/0808*    (2024.01)
(58) Field of Classification Search
    USPC ......................................................... 370/329
    See application file for complete search history.

(56)                References Cited

U.S. PATENT DOCUMENTS

2020/0100286 A1 *  3/2020  Xu ........................... H04L 1/187
2022/0337371 A1 * 10/2022  Lin ........................ H04L 5/0048
2023/0111063 A1 *  4/2023  Ji ........................... H04L 5/0057
                                                    370/329

FOREIGN PATENT DOCUMENTS

KR       20120068960        6/2012
WO    WO-2016190156 A1 * 12/2016   ........... H04W 16/14
WO       WO2019140666       7/2019

OTHER PUBLICATIONS

Ericsson, "UL signals and channels for NR-U," R1-1912708, 3GPP TSG-RAN WG1 Meeting #99, Reno, Nevada, USA, Nov. 18-22, 2019, 24 pages.
Moderator (Ericsson), "Feature lead summary for Maintenance of UL Signals and Channels," R1-2003842, 3GPP TSG-RAN WG1 Meeting #101-e, e-Meeting, May 25-Jun. 5, 2020, 9 pages.
Notice of Allowance in Korean Appln. No. 10-2022-7042114, mailed on Feb. 26, 2025, 10 pages (with English translation).
Panasonic, "UL signals and channels for NR-U," R1-1912775, 3GPP TSG RAN WG1 #99, Reno, Nevada, USA, Nov. 18-22, 2019, 15 pages.

* cited by examiner

FIG. 6

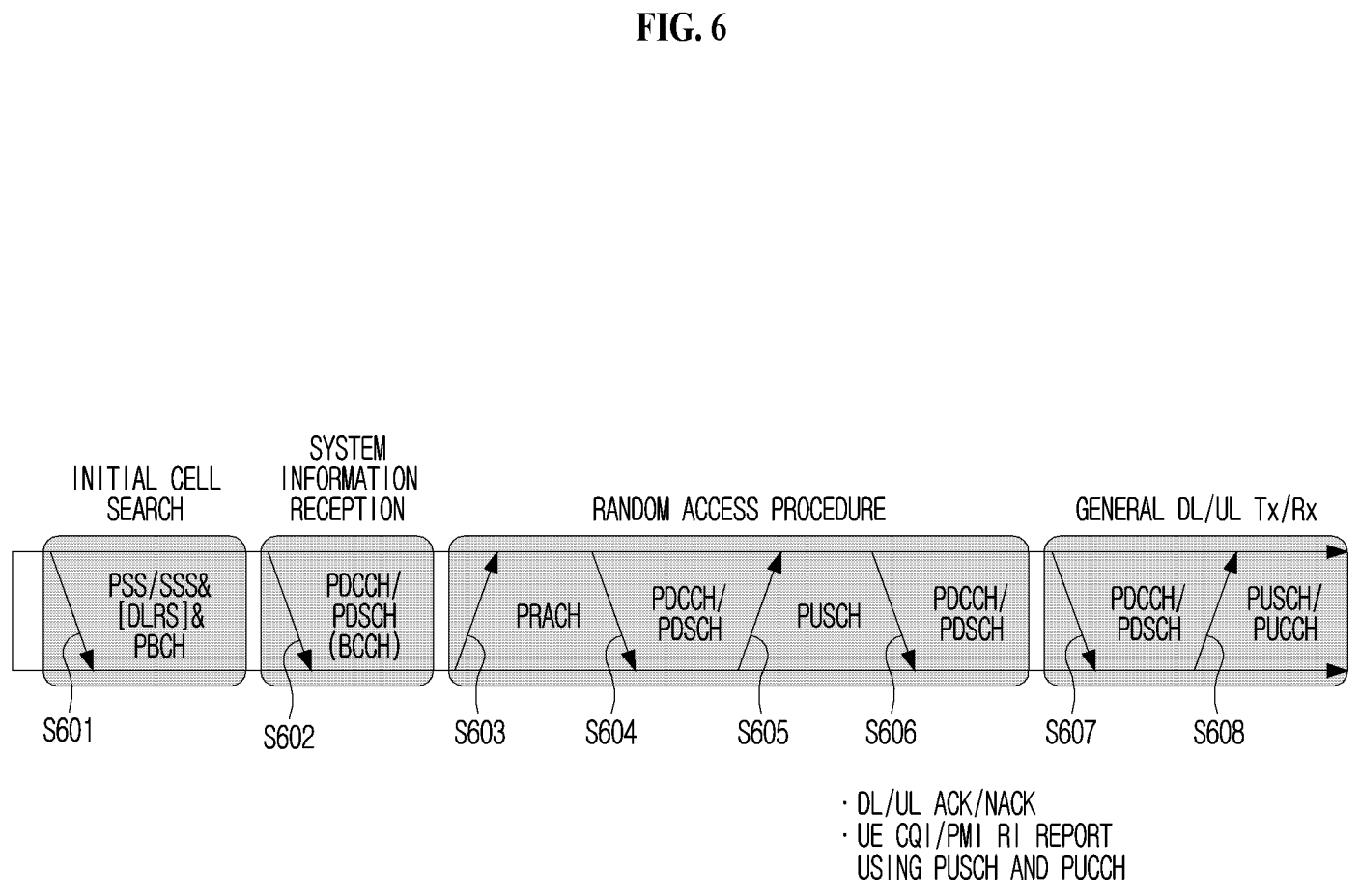

INITIAL CELL SEARCH

PSS/SSS& [DLRS]& PBCH — S601

SYSTEM INFORMATION RECEPTION

PDCCH/ PDSCH (BCCH) — S602

RANDOM ACCESS PROCEDURE

PRACH — S603

PDCCH/ PDSCH — S604

PUSCH — S605

PDCCH/ PDSCH — S606

GENERAL DL/UL Tx/Rx

PDCCH/ PDSCH — S607

PUSCH/ PUCCH — S608

· DL/UL ACK/NACK
· UE CQI/PMI RI REPORT
  USING PUSCH AND PUCCH

FIG. 7
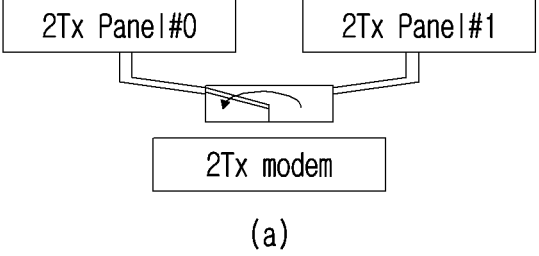
(a)
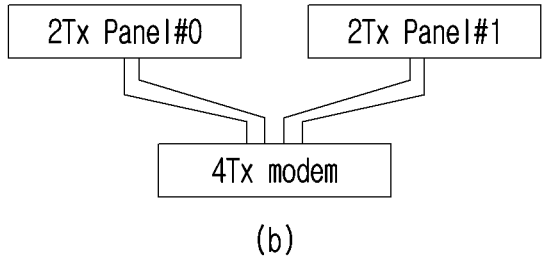
(b)

FIG. 8

FIG. 9
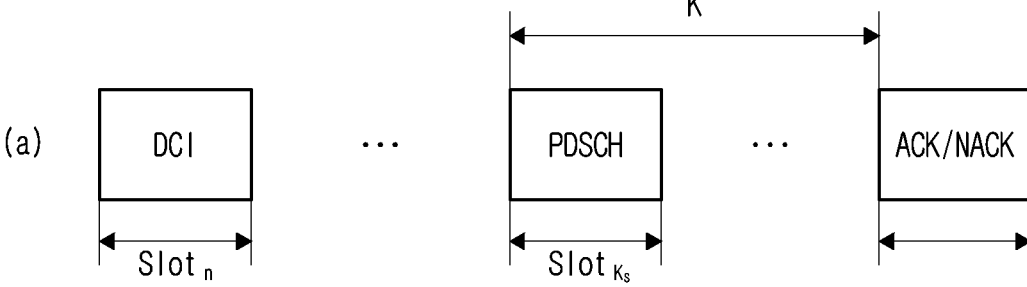
(a)
(b)

FIG. 12

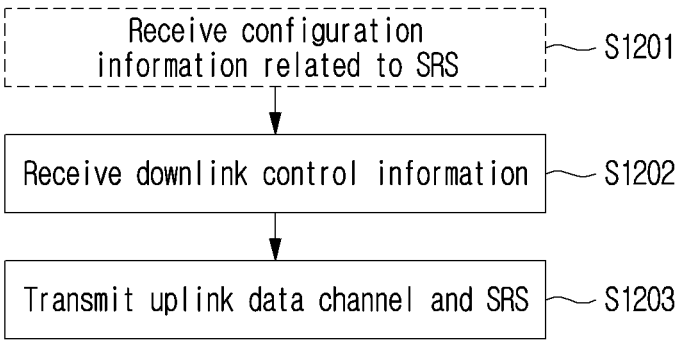

```
┌ ─ ─ ─ ─ ─ ─ ─ ─ ─ ─ ─ ─ ─ ─ ─ ┐
    Receive configuration
  information related to SRS        ⌐ S1201
└ ─ ─ ─ ─ ─ ─ ─ ─ ─ ─ ─ ─ ─ ─ ─ ┘
              │
              ▼
┌───────────────────────────────┐
 Receive downlink control information   S1202
└───────────────────────────────┘
              │
              ▼
┌───────────────────────────────┐
 Transmit uplink data channel and SRS   S1203
└───────────────────────────────┘
```

FIG. 13

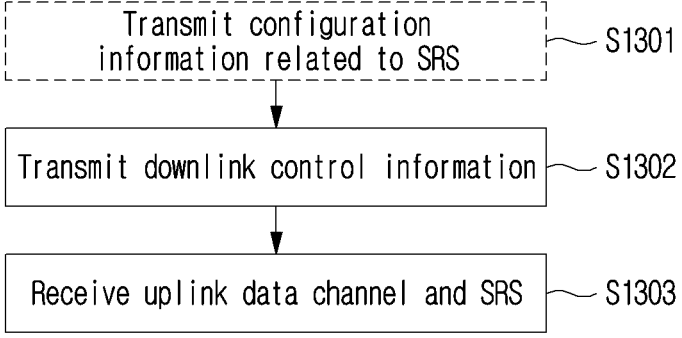

```
┌ ─ ─ ─ ─ ─ ─ ─ ─ ─ ─ ─ ─ ─ ─ ─ ┐
    Transmit configuration
  information related to SRS        ⌐ S1301
└ ─ ─ ─ ─ ─ ─ ─ ─ ─ ─ ─ ─ ─ ─ ─ ┘
              │
              ▼
┌───────────────────────────────┐
 Transmit downlink control information   S1302
└───────────────────────────────┘
              │
              ▼
┌───────────────────────────────┐
 Receive uplink data channel and SRS   S1303
└───────────────────────────────┘
```

METHOD AND DEVICE FOR TRANSMITTING OR RECEIVING SOUNDING REFERENCE SIGNAL IN WIRELESS COMMUNICATION SYSTEM

CROSS-REFERENCE TO RELATED APPLICATIONS

This application is a National Stage application under 35 U.S.C. § 371 of International Application No. PCT/KR2021/007029, filed on Jun. 4, 2021, which claims the benefit of Korean Application No. 10-2020-0069562, filed on Jun. 9, 2020. The disclosures of the prior applications are incorporated by reference in their entirety.

TECHNICAL FIELD

The present disclosure relates to a wireless communication system, and in more detail, relates to a method and an apparatus of transmitting and receiving a sounding reference signal in a wireless communication system.

BACKGROUND

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

SUMMARY

A technical object of the present disclosure is to provide a method and an apparatus of transmitting and receiving a sounding reference signal.

In addition, an additional technical object of the present disclosure is to provide a method and an apparatus of configuring/indicating a transmission bandwidth of a sounding reference signal.

In addition, an additional technical object of the present disclosure is to provide a method and an apparatus for time domain bundling between a sounding reference signal and an uplink demodulation reference signal.

The technical objects to be achieved by the present disclosure are not limited to the above-described technical objects, and other technical objects which are not described herein will be clearly understood by those skilled in the pertinent art from the following description.

A method of transmitting a sounding reference signal (SRS) in a wireless communication system may include: receiving, from a base station, downlink control information (DCI) for scheduling a physical uplink shared channel (PUSCH) and triggering transmission of the SRS and transmitting, to the base station, the PUSCH and the SRS based on the DCI. A transmission bandwidth of the SRS may determined based on frequency resource allocation information for transmission of the PUSCH.

A method of receiving a sounding reference signal (SRS) in a wireless communication system may include: transmitting, to a terminal, downlink control information (DCI) for scheduling a physical uplink shared channel (PUSCH) and triggering transmission of the SRS and receiving, from the terminal, the PUSCH and the SRS. A transmission bandwidth of the SRS may be determined based on frequency resource allocation information for transmission of the PUSCH.

According to an embodiment of the present disclosure, dynamic/flexible/low-latency downlink and/or uplink channel estimation can be accurately performed by dynamically configuring/indicating frequency domain resource allocation for a sounding reference signal.

According to an embodiment of the present disclosure, a frequency domain resource having good channel quality may be reused by performing sounding on a frequency resource/bandwidth for uplink transmission.

In addition, according to an embodiment of the present disclosure, an additional channel may be searched for by performing sounding on a frequency resource/bandwidth other than a frequency resource/bandwidth for uplink transmission.

In addition, according to an embodiment of the present disclosure, it is possible to prevent collision with an uplink channel of another terminal in an unlicensed band.

In addition, according to an embodiment of the present disclosure, since an uplink demodulation reference signal and time domain bundling are applied, increasing accuracy of uplink channel estimation.

In addition, according to an embodiment of the present disclosure, since an uplink demodulation reference signal and time domain bundling are applied, performance of uplink channel estimation can be maintained even if fewer resources are allocated for a sounding reference signal, uplink resources can be used efficiently.

Effects achievable by the present disclosure are not limited to the above-described effects, and other effects which are not described herein may be clearly understood by those skilled in the pertinent art from the following description.

BRIEF DESCRIPTION OF THE DRAWINGS

Accompanying drawings included as part of detailed description for understanding the present disclosure provide embodiments of the present disclosure and describe technical features of the present disclosure with detailed description.

FIG. 6 illustrates physical channels used in a wireless communication system to which the present disclosure may be applied and a general signal transmission and reception method using them.

FIG. 7 is a diagram illustrating multi panel terminals in a wireless communication system to which the present disclosure may be applied.

FIG. 8 is a diagram illustrating interlaced resource blocks in a wireless communication system to which the present disclosure may be applied.

FIG. 9 is a diagram illustrating downlink/uplink transmission timing in a wireless communication system to which the present disclosure may be applied.

FIG. 12 is a diagram illustrating an operation of a terminal for transmitting and receiving a sounding reference signal according to an embodiment of the present disclosure.

FIG. 13 is a diagram illustrating an operation of a base station for transmitting and receiving a sounding reference signal according to an embodiment of the present disclosure.

DETAILED DESCRIPTION

Figure 1:
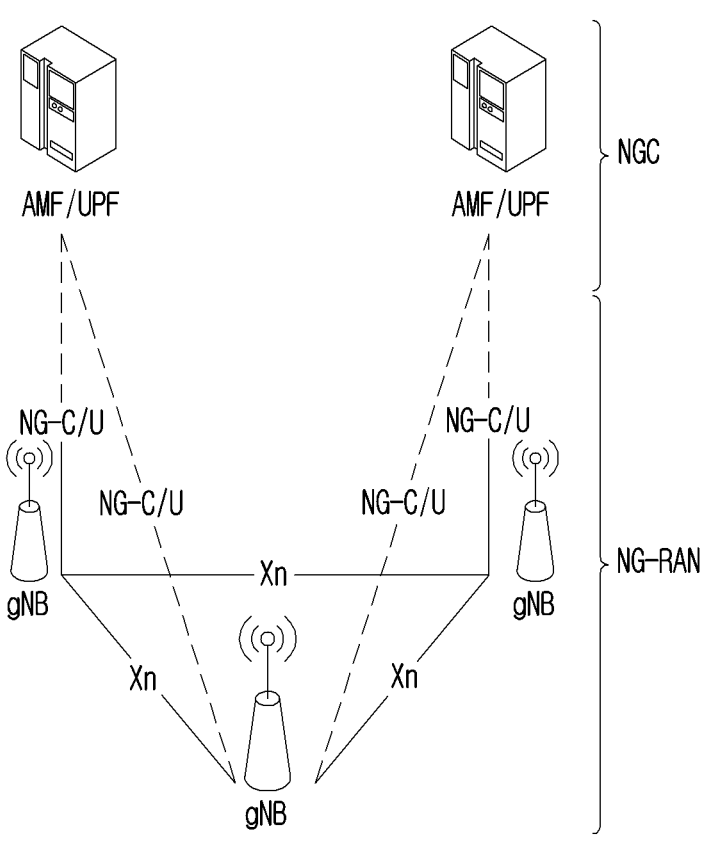
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB (evolved-NodeB), a gNB (Next Generation NodeB), a BTS (base transceiver system), an Access Point (AP), a Network (5G network), an AI (Artificial Intelligence) system/module, an RSU (road side unit), a robot, a drone (UAV: Unmanned Aerial Vehicle), an AR (Augmented Reality) device, a VR (Virtual Reality) device, etc. In addition, a terminal may be fixed or mobile, and may be substituted with a term such as a UE (User Equipment), an MS (Mobile Station), a UT (user terminal), an MSS (Mobile Subscriber Station), an SS (Subscriber Station), an AMS (Advanced Mobile Station), a WT (Wireless terminal), an MTC (Machine-Type Communication) device, an M2M (Machine-to-Machine) device, a D2D (Device-to-Device) device, a vehicle, an RSU (road side unit), a robot, an AI (Artificial Intelligence) module, a drone (UAV: Unmanned Aerial Vehicle), an AR (Augmented Reality) device, a VR (Virtual Reality) device, etc.

The following description may be used for a variety of radio access systems such as CDMA, FDMA, TDMA, OFDMA, SC-FDMA, etc. CDMA may be implemented by a wireless technology such as UTRA (Universal Terrestrial Radio Access) or CDMA2000. TDMA may be implemented by a radio technology such as GSM (Global System for Mobile communications)/GPRS (General Packet Radio Service)/EDGE (Enhanced Data Rates for GSM Evolution). OFDMA may be implemented by a radio technology such as IEEE 802.11 (Wi-Fi), IEEE 802.16 (WiMAX), IEEE 802-20, E-UTRA (Evolved UTRA), etc. UTRA is a part of a UMTS (Universal Mobile Telecommunications System).

3GPP (3rd Generation Partnership Project) LTE (Long Term Evolution) is a part of an E-UMTS (Evolved UMTS) using E-UTRA and LTE-A (Advanced)/LTE-A pro is an advanced version of 3GPP LTE. 3GPP NR (New Radio or New Radio Access Technology) is an advanced version of 3GPP LTE/ LTE-A/LTE-A pro.

To clarify description, it is described based on a 3GPP communication system (e.g., LTE-A, NR), but a technical idea of the present disclosure is not limited thereto. LTE means a technology after 3GPP TS (Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211 (physical channels and modulation), TS 36.212 (multiplexing and channel coding), TS 36.213 (physical layer procedures), TS 36.300 (overall description), TS 36.331 (radio resource control) may be referred to.

For 3GPP NR, TS 38.211 (physical channels and modulation), TS 38.212 (multiplexing and channel coding), TS 38.213 (physical layer procedures for control), TS 38.214 (physical layer procedures for data), TS 38.300 (NR and NG-RAN (New Generation-Radio Access Network) overall description), TS 38.331 (radio resource control protocol specification) may be referred to.

Abbreviations of terms which may be used in the present disclosure is defined as follows.

BM: beam management

CQI: Channel Quality Indicator

CRI: channel state information-reference signal resource indicator

CSI: channel state information

CSI-IM: channel state information-interference measurement

CSI-RS: channel state information-reference signal

DMRS: demodulation reference signal

FDM: frequency division multiplexing

FFT: fast Fourier transform

IFDMA: interleaved frequency division multiple access

IFFT: inverse fast Fourier transform

L1-RSRP: Layer 1 reference signal received power

L1-RSRQ: Layer 1 reference signal received quality

MAC: medium access control

NZP: non-zero power

OFDM: orthogonal frequency division multiplexing

PDCCH: physical downlink control channel

PDSCH: physical downlink shared channel

PMI: precoding matrix indicator

RE: resource element

RI: Rank indicator

RRC: radio resource control

RSSI: received signal strength indicator

Rx: Reception

QCL: quasi co-location

SINR: signal to interference and noise ratio

SSB (or SS/PBCH block): Synchronization signal block (including PSS (primary synchronization signal), SSS (secondary synchronization signal) and PBCH (physical broadcast channel))

TDM: time division multiplexing

TRP: transmission and reception point

TRS: tracking reference signal

Tx: transmission

UE: user equipment

ZP: zero power

Overall System

As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA (NG-Radio Access) user plane (i.e., a new AS (access stratum) sublayer/PDCP (Packet Data Convergence Protocol)/RLC (Radio Link Control)/MAC/PHY) and UE. The gNBs are interconnected through a Xn interface. The gNB, in addition, is connected to an NGC (New Generation Core) through an NG interface. In more detail, the gNB is connected to an AMF (Access and Mobility Management Function) through an N2 interface, and is connected to a UPF (User Plane Function) through an N3 interface.

Figure 2:
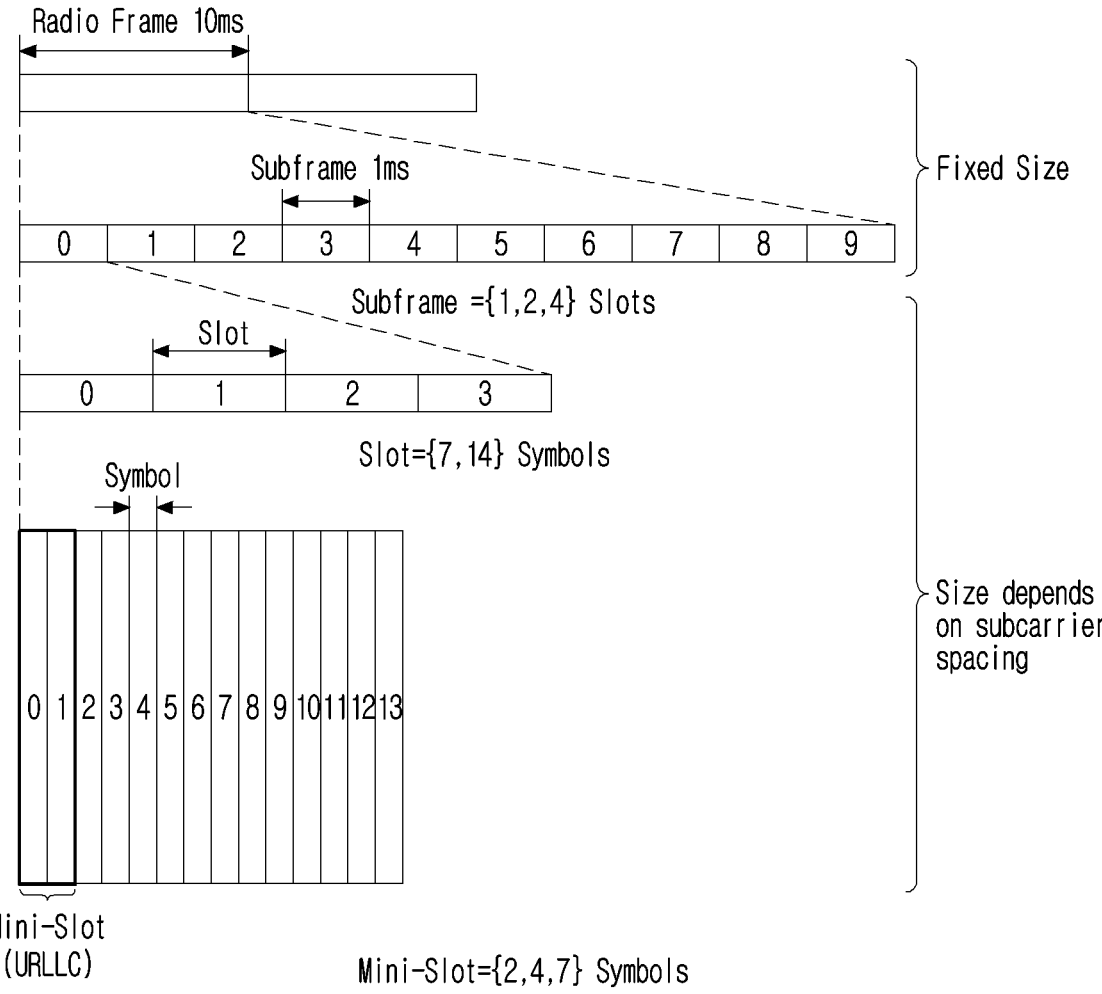
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, $\mu$). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| $\mu$ | $\Delta f = 2^\mu \cdot 15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier band-width are supported, and when a SCS is 60 kHz or higher, a bandwidth wider than 24.25 GHz is supported to overcome a phase noise. An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
|---|---|---|
| FR1 | 410 MHz–7125 MHz | 15, 30, 60 kHz |
| FR2 | 24250 MHz–52600 MHz | 60, 120, 240 kHz |

Regarding a frame structure in an NR system, a size of a variety of fields in a time domain is expresses as a multiple of a time unit of $Tc=1/(\Delta fmax \cdot Nf)$. Here, $\Delta fmax$ is $480 \cdot 10^3$ Hz and Nf is 4096. Downlink and uplink transmission is configured (organized) with a radio frame having a duration of $Tf=1/(\Delta fmaxNf/100) \cdot Tc=10$ ms. Here, a radio frame is configured with 10 subframes having a duration of $Tsf=(\Delta fmaxNf/1000) \cdot Tc=1$ ms, respectively. In this case, there may be one set of frames for an uplink and one set of frames for a downlink. In addition, transmission in an uplink frame No. i from a terminal should start earlier by $TTA=(NTA+NTA,offset)$ Tc than a corresponding downlink frame in a corresponding terminal starts. For a subcarrier spacing con-figuration u, slots are numbered in an increasing order of $ns_\mu \in \{0, \ldots, Nslotsubframe,\mu-1\}$ in a subframe and are numbered in an increasing order of $ns,f_\mu \in \{0, \ldots, Nslotframe,\mu-1\}$ in a radio frame. One slot is configured with Nsymbslot consecutive OFDM symbols and Nsymb-slot is determined according to CP. A start of a slot $ns_\mu$ in a subframe is temporally arranged with a start of an OFDM symbol $ns_\mu Nsymbslot$ in the same subframe. All terminals may not perform transmission and reception at the same time, which means that all OFDM symbols of a downlink slot or an uplink slot may not be used. Table 3 represents the number of OFDM symbols per slot (Nsymbslot), the number of slots per radio frame (Nslotframe,$\mu$) and the number of slots per subframe (Nslotsubframe,$\mu$) in a normal CP and Table 4 represents the number of OFDM symbols per slot, the number of slots per radio frame and the number of slots per subframe in an extended CP.

TABLE 3

| $\mu$ | Nsymbslot | Nslotframe, $\mu$ | Nslotsubframe, $\mu$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| $\mu$ | Nsymbslot | Nslotframe, $\mu$ | Nslotsubframe, $\mu$ |
|---|---|---|---|
| 2 | 12 | 40 | 4 |

FIG. 2 is an example on $\mu=2$ (SCS is 60 kHz), 1 subframe may include 4 slots referring to Table 3. 1 subframe={1,2,4} slot shown in FIG. 2 is an example, the number of slots which may be included in 1 subframe is defined as in Table 3 or Table 4. In addition, a mini-slot may include 2, 4 or 7 symbols or more or less symbols. Regarding a physical resource in a NR system, an antenna port, a resource grid, a resource element, a resource block, a carrier part, etc. may be considered. Hereinafter, the physical resources which may be considered in an NR system will be described in detail.

First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL (quasi co-located or quasi co-location) relationship. In this case, the large-scale property includes at least one of delay spread, doppler spread, fre-quency shift, average received power, received timing.

Figure 3:
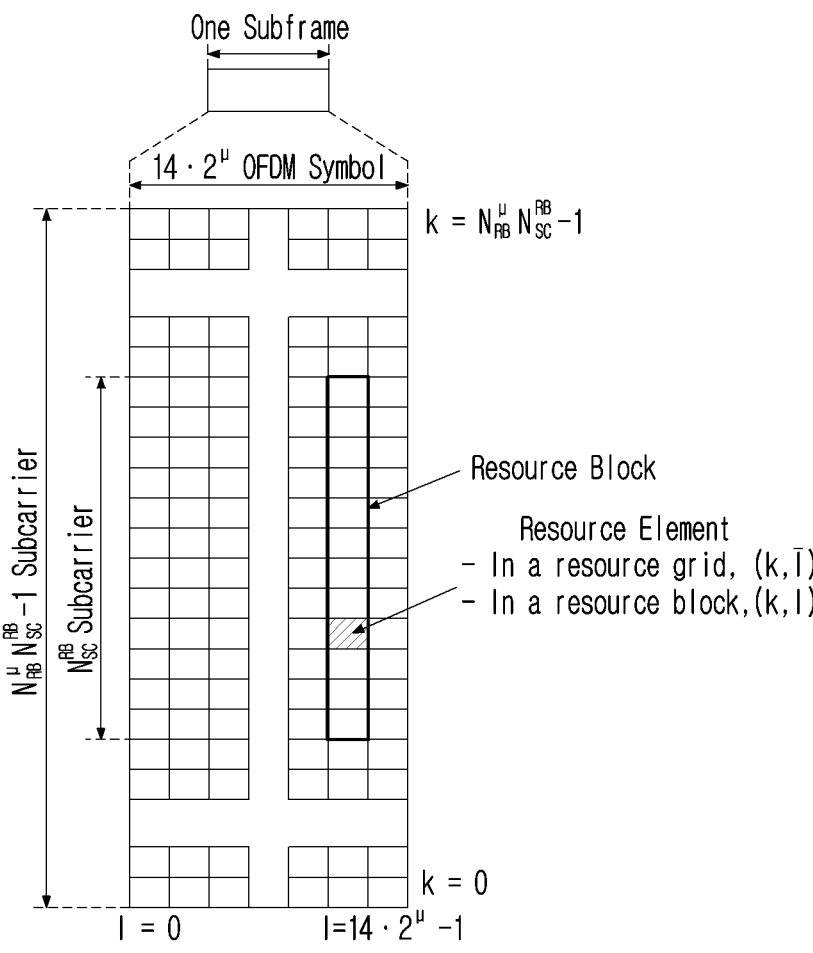
FIG. 3 illustrates a resource grid in a wireless communication system to which the present disclosure may be applied.

FIG. 3 illustrates a resource grid in a wireless communi-cation system to which the present disclosure may be applied.

In reference to FIG. 3, it is illustratively described that a resource grid is configured with NRBμNscRB subcarriers in a frequency domain and one subframe is configured with $14 \cdot 2^\mu$ OFDM symbols, but it is not limited thereto. In an NR system, a transmitted signal is described by OFDM symbols of $2^\mu Nsymb(\mu)$ and one or more resource grids configured with NRBμNscRB subcarriers. Here, NRBμ≤NRBmax,μ. The NRBmax,μ represents a maximum transmission band-width, which may be different between an uplink and a downlink as well as between numerologies. In this case, one resource grid may be configured per μ and antenna port p. Each element of a resource grid for μ and an antenna port p is referred to as a resource element and is uniquely identified by an index pair (k,l'). Here, $k=0, \ldots, NRBμNscRB-1$ is an index in a frequency domain and $l'=0, \ldots, 2^\mu Nsymb(\mu)-1$ refers to a position of a symbol in a subframe. When referring to a resource element in a slot, an index pair (k,l) is used. Here, $l-0, \ldots, Nsymbμ-1$. A resource element (k,l') for μ and an antenna port p corresponds to a complex value, $a_{k,l'}(p,\mu)$. When there is no risk of confusion or when a specific antenna port or numerology is not specified, indexes p and μ may be dropped, whereupon a complex value may be ak,l'(p) or ak,l'. In addition, a resource block (RB) is defined as NscRB=12 consecutive subcarriers in a frequency domain.

Point A plays a role as a common reference point of a resource block grid and is obtained as follows.

offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.

absoluteFrequencyPointA represents a frequency-position of point A expressed as in ARFCN (absolute radio-frequency channel number).

Common resource blocks are numbered from 0 to the top in a frequency domain for a subcarrier spacing configuration μ. The center of subcarrier 0 of common resource block 0 for a subcarrier spacing configuration μ is identical to 'point A'. A relationship between a common resource block number nCRBμ and a resource element (k,l) for a subcarrier spacing configuration μ in a frequency domain is given as in the following Equation 1.

$$n_{CRB}^{\mu} = \left\lfloor \frac{k}{N_{sc}^{RB}} \right\rfloor \qquad \text{[Equation 1]}$$

In Equation 1, k is defined relatively to point A so that k=0 corresponds to a subcarrier centering in point A. Physical resource blocks are numbered from 0 to NBWP,isize,μ−1 in a bandwidth part (BWP) and i is a number of a BWP. A relationship between a physical resource block nPRB and a common resource block nCRB in BWP i is given by the following Equation 2.

$$n_{CRB}^{\mu} = n_{PRB}^{\mu} + N_{BWP,i}^{start,\mu} \qquad \text{[Equation 2]}$$

NBWP,istart,μ is a common resource block that a BWP starts relatively to common resource block 0.

Figure 4:
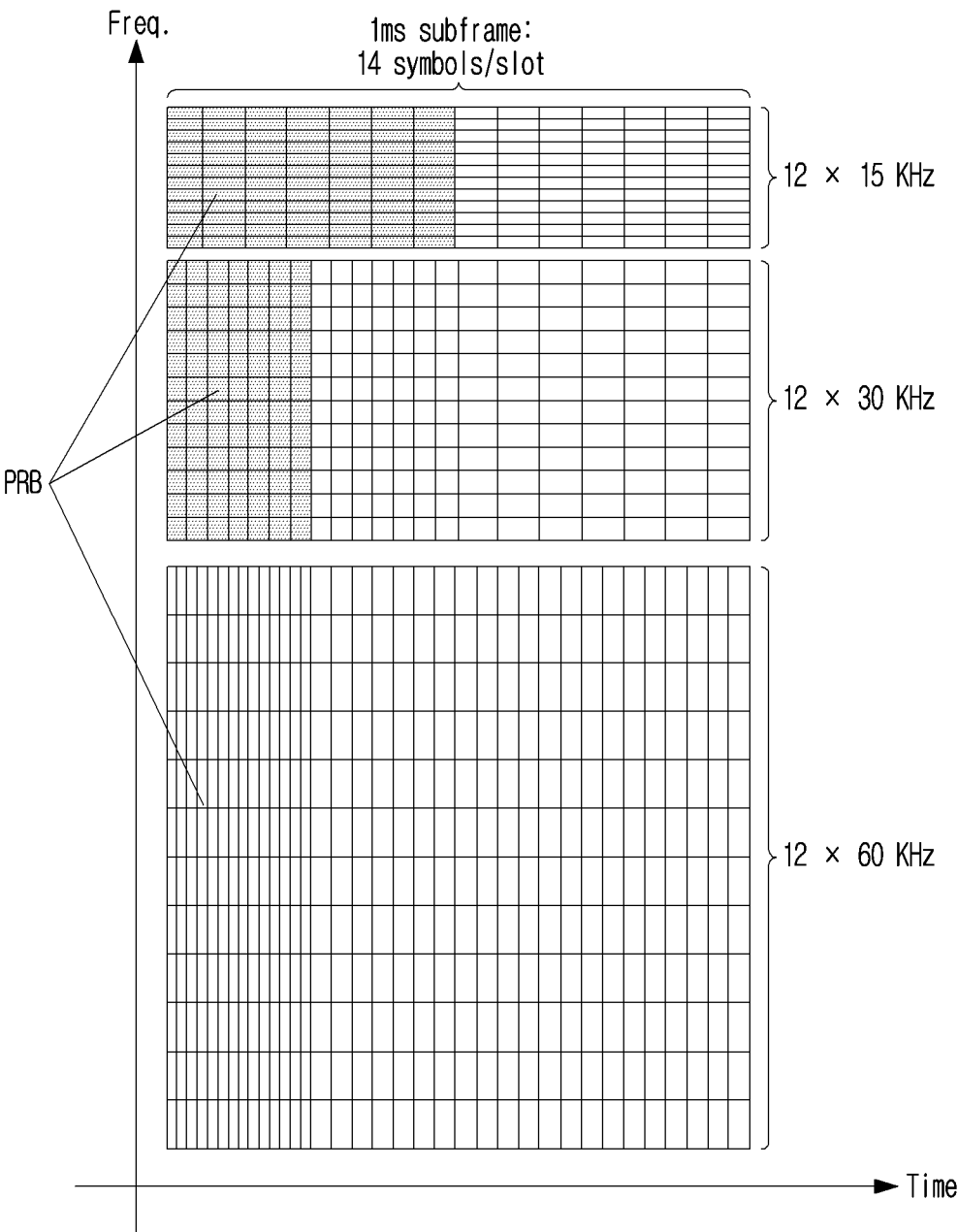
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
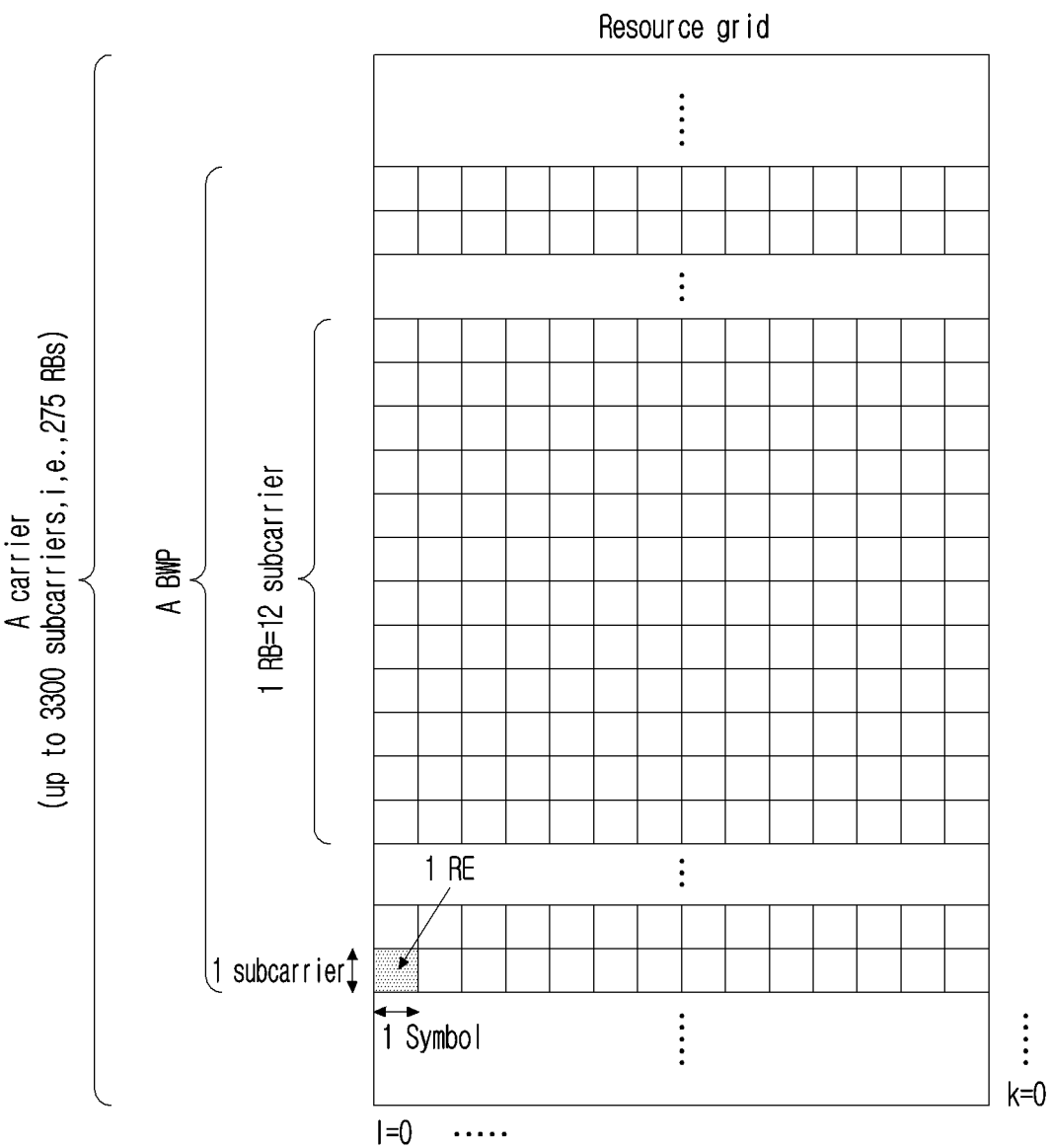
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP (Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE (Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH (Physical Uplink Shared Channel)/PUCCH (physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK (Acknowledgement/Non-Acknowledgement) signal, a CQI (Channel Quality Indicator), a PMI (Precoding Matrix Indicator), a RI (Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
| --- | --- |
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL (Supplementary UL), frequency resource allocation, time resource allocation, frequency hopping, etc.), information related to a transport block (TB) (e.g., MCS (Modulation Coding and Scheme), a NDI (New Data Indicator), a RV (Redundancy Version), etc.), information related to a HARQ (Hybrid-Automatic Repeat and request) (e.g., a process number, a DAI (Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined. DCI format 0_0 is used for scheduling of a PUSCH in one cell. Information included in DCI format 0_0 is CRC (cyclic redundancy check) scrambled by a C-RNTI (Cell Radio Network Temporary Identifier) or a CS-RNTI (Configured Scheduling RNTI) or a MCS-C-RNTI (Modulation Coding Scheme Cell RNTI) and transmitted.

DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI (Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 1_0, 1_1 and 1_2 may include resource information (e.g., frequency resource allocation, time resource allocation, VRB (virtual resource block)-PRB (physical resource block) mapping, etc.), information related to a transport block (TB) (e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS (sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

Multi Panel Operations

'A Panel' referred to in the present disclosure may be interpreted/applied as 'a plurality of (or at least one) panels' or 'a panel group' (having similarity/a common value with regard to a specific characteristic (e.g., timing advance (TA), a power control parameter, etc.)). Alternatively, 'a panel' referred to in the present disclosure may be interpreted/applied as 'a plurality of (or at least one) antenna ports' or 'a plurality of (or at least one) uplink resources' or 'an antenna port group' or 'an uplink resource group (or set))' (having similarity/a common value with regard to a specific characteristic (e.g., TA, a power control parameter, etc.)). Alternatively, 'a panel' referred to in the present disclosure may be interpreted/applied as 'a plurality of (or at least one) beams' or 'at least one beam group (or set)' (having similarity/a common value with regard to a specific characteristic (e.g., TA, a power control parameter, etc.)). Alternatively, 'a panel' referred to in the present disclosure may be defined as a unit for a terminal to configure a transmission/reception beam. For example, 'a transmission panel' may be defined as a unit which may generate a plurality of candidate transmission beams in one panel, but may use only one beam of them in transmission at a specific time. In other words, only one transmission beam (spatial relation information RS) may be used per Tx panel to transmit a specific uplink signal/channel. In addition, 'a panel' in the present disclosure may refer to 'a plurality of (or at least one) antenna ports' or 'an antenna port group' or 'an uplink resource group (or set))' with common/similar uplink synchronization and may be interpreted/applied as an expression which is generalized as 'an uplink synchronization unit (USU)'. In addition, 'a panel' in the present disclosure may be interpreted/applied as an expression which is generalized as 'an uplink transmission entity (UTE)'.

In addition, the 'uplink resource (or resource group)' may be interpreted/applied as a PUSCH/PUCCH/SRS/PRACH resource (or resource group (or set)). In addition, the interpretation/application may be interpreted/applied conversely. In addition, 'an antenna (or an antenna port)' may represent a physical or logical antenna (or antenna port) in the present disclosure.

In other words, 'a panel' referred to in the present disclosure may be variously interpreted as 'a terminal antenna element group', 'a terminal antenna port group', 'a terminal logical antenna group', etc. In addition, for which physical/logical antennas or antenna ports will be combined and mapped to one panel, a variety of schemes may be considered by considering a position/a distance/a correlation between antennas, a RF configuration, and/or an antenna (port) virtualization scheme, etc. Such a mapping process may be different according to terminal implementation. In addition, 'a panel' referred to in the present disclosure may be interpreted/applied as 'a plurality of panels' or 'a panel group' (having similarity with regard to a specific characteristic).

Hereinafter, multi panel structures will be described.

For terminal implementation in a high-frequency band, modeling terminal equipped with a plurality of panels (e.g., configured with one or a plurality of antennas) is considered (e.g., 2 bi-directional panels in 3GPP UE antenna modeling). A variety of forms may be considered for such implementation of a plurality of panels of a terminal. The after-described contents are based on a terminal which supports a plurality of panels, but they may be extended and applied to a base station which supports a plurality of panels (e.g., TRP). The after-described contents related to multi panel structures may be applied to transmission and reception of a signal and/or a channel considering multi panels described in the present disclosure.

FIG. 7 is a diagram illustrating multi panel terminals in a wireless communication system to which the present disclosure may be applied.

FIG. 7(a) illustrates implementation of RF (radio frequency) switch-based multi panel terminals and FIG. 7(b) illustrates implementation of RF connection-based multi panel terminals.

For example, it may be implemented based on RF switch as in FIG. 7(a). In this case, only one panel is activated for a moment, and it may be impossible to transmit a signal for a certain duration of time to change an activated panel (i.e., panel switching).

For implementation of a plurality of panels in a different way, a RF chain may be connected respectively so that each panel can be activated anytime as in FIG. 7(b). In this case, time for panel switching may be 0 or too little. And, it may be possible to simultaneously transmit a signal by activating a plurality of panels at the same time (STxMP: simultaneous transmission across multi-panel) according to a modem and power amplifier configuration.

For a terminal having a plurality of panels, a radio channel state may be different per panel, and in addition, a RF/antenna configuration may be different per panel, so a method in which a channel is estimated per panel is needed. In particular, a process in which one or a plurality of SRS resources are transmitted respectively per panel is needed to measure uplink quality or manage an uplink beam, or to measure downlink quality per panel or manage a downlink beam by utilizing channel reciprocity. Here, a plurality of SRS resources may be SRS resources which are transmitted by a different beam in one panel or may be SRS resources which are repeatedly transmitted by the same beam. Hereinafter, for convenience, a set of SRS resources transmitted in the same panel (a specific usage parameter (e.g., beam management, antenna switching, a codebook-based PUSCH, a non-codebook based PUSCH) and a specific time domain behavior (e.g., aperiodic, semi-persistent, or periodic)) may be referred to as a SRS resource group. For this SRS resource group, a SRS resource set configuration supported in a Rel-15 NR system may be utilized as it is or it may be configured separately by bundling one or a plurality of SRS resources (having the same time domain behavior and usage).

For reference, only when usage is beam management for the same usage and time domain behavior in Rel-15, a plurality of SRS resource sets may be configured. In addition, it is defined so that simultaneous transmission cannot be performed between SRS resources configured in the same SRS resource set, but simultaneous transmission can be performed between SRS resources belonging to a different SRS resource set. Accordingly, if panel implementation and simultaneous transmission of a plurality of panels as in FIG. 7(b) are considered, a corresponding concept (a SRS resource set) itself may be matched to a SRS resource group. But, a SRS resource group may be separately defined if even implementation (panel switching) as in FIG. 7(a) is considered. In an example, a configuration may be given by giving a specific ID to each SRS resource so that resources with the same ID belong to the same SRS resource group and resources with a different ID belong to a different resource group.

For example, it is assumed that 4 SRS resource sets configured for BM usage (RRC parameter usage is configured as 'BeamManagement') are configured to UE. Hereinafter, for convenience, each is referred to as SRS resource set A, B, C, D. In addition, a situation is considered which applies implementation performing SRS transmission by corresponding each of the sets to one (Tx) panel because UE implements a total of 4 (Tx) Panels.

TABLE 6

| The maximum number of SRS resource sets across all time domain behaviors (periodic/semi-persistent/aperiodic) reported in 2-30 | Additional limit to the maximum number of the maximum SRS resource sets per supported time domain behavior (periodic/semi-persistent/aperiodic) |
|---|---|
| 1 | 1 |
| 2 | 1 |
| 3 | 1 |
| 4 | 2 |
| 5 | 2 |
| 6 | 2 |
| 7 | 4 |
| 8 | 4 |

In Rel-15 standards, such UE implementation is more clearly supported by the following agreement. In other words, for UE which performs capability reporting for a value reported in feature group (FG) 2-30 as 7 or 8 in Table 6, a total of up to 4 SRS resource sets for BM (per supported time domain behavior) may be configured as in the right column of Table 6. As above, implementation which performs transmission by corresponding one UE panel to each set may be applied.

In this case, when 4 panel UE corresponds each panel to one SRS resource set for BM and transmits it, the number itself of configurable SRS resources per each set is also supported by separate UE capability signaling. For example, it is assumed that 2 SRS resources are configured in the each set. It may correspond to 'the number of UL beams' which can be transmitted per each panel. In other words, the UE may respectively correspond 2 UL beams to 2 configured SRS resources per each panel and transmit them, when 4 panels are implemented. In this situation, according to Rel-15 standards, one of a codebook (CB)-based UL or non-codebook (NCB)-based UL mode may be configured for final UL PUSCH transmission scheduling. In any case, only one SRS resource set (having usage set as "CB-based UL" or "NCB-based UL") configuration, i.e., only one dedicated SRS resource set (for a PUSCH) configuration, is supported in Rel-15 standards.

Hereinafter, multi panel UE (MPUE) categories will be described.

Regarding the above-described multi panel operations, the following 3 MPUE categories may be considered. Specifically, 3 MPUE categories may be classified according to i) whether multiple panels may be activated and/or ii) transmission using multiple panels may be possible.

MPUE category 1: In a terminal that multiple panels are implemented, only one panel may be activated at a time. A delay for panel switching/activation may be configured as [X] ms. In an example, the delay may be configured to be longer than a delay for beam switching/activation and may be configured in a unit of a symbol or in a unit of a slot. MPUE category 1 may correspond to MPUE-assumption1 described in standardization-related documents (e.g., a 3gpp agreement, a technical report (TR) document and/or a technical specification (TS) document, etc.).

MPUE category 2: In a terminal that multiple panels are implemented, multiple panels may be activated at a time. One or more panels may be used for transmission. In other words, simultaneous transmission using panels may be performed in a corresponding category. MPUE category 2 may correspond to MPUE-assumption2 described in standardization-related documents (e.g., a 3gpp agreement, a TR document and/or a TS document, etc.).

MPUE category 3: In a terminal that multiple panels are implemented, multiple panels may be activated at a time, but only one panel may be used for transmission. MPUE category 3 may correspond to MPUE-assumption3 described in standardization-related documents (e.g., a 3gpp agreement, a TR document and/or a TS document, etc.).

Regarding multi panel-based signal and/or channel transmission and reception suggested in the present disclosure, at least one of the above-described 3 MPUE categories may be supported. In an example, in Rel-16, MPUE category 3 of the following 3 MPUE categories may be (selectively) supported.

In addition, information on a MPUE category may be predefined in specifications (i.e., standards). Alternatively, information on a MPUE category may be configured semi-statically and/or may be indicated dynamically according to a system situation (i.e., a network aspect, a terminal aspect). In this case, a configuration/an indication, etc. related to multi panel-based signal and/or channel transmission and reception may be configured/indicated by considering a MPUE category.

Hereinafter, a configuration/an indication related to panel-specific transmission/reception will be described.

Regarding a multi panel-based operation, signal and/or channel transmission and reception may be performed in a panel-specific way. Here, being panel-specific may mean that signal and/or channel transmission and reception in a unit of a panel may be performed. Panel-specific transmission and reception may be referred to as panel-selective transmission and reception.

Regarding panel-specific transmission and reception in a multi panel-based operation suggested in the present disclosure, a method of using identification information (e.g., an identifier (ID), an indicator, etc.) for configuring and/or indicating a panel which will be used for transmission and reception among one or more panels may be considered.

In an example, an ID for a panel may be used for panel-selective transmission of a PUSCH, a PUCCH, a SRS, and/or a PRACH among activated multiple panels. The ID may be configured/defined based on at least any one of the following 4 methods (options (Alts) 1, 2, 3, 4).

Alt.1: An ID for a panel may be a SRS resource set ID.

In an example, it may be desirable to correspond each UE Tx panel to a SRS resource set configured with regard to terminal implementation when considering a) an aspect that SRS resources of multiple SRS resource sets having the same time domain behavior are simultaneously transmitted in the same BWP, b) an aspect that a power control parameter is configured in a unit of a SRS resource set, c) an aspect that a terminal may report as up to 4 SRS resource sets (they may correspond to up to 4 panels) according to a supported time domain behavior. In addition, an Alt. 1 scheme has an advantage that a SRS resource set related to each panel may be used for 'codebook' and 'non-codebook'-based PUSCH transmission. In addition, for an Alt. 1 scheme, multiple SRS resources belonging to multiple SRS resource sets may be selected by extending a SRI (SRS resource indicator) field of DCI. In addition, a mapping table of an SRI to an SRS resource may need to be extended to include SRS resources in the whole SRS resource set.

ii) Alt.2: An ID for a panel may be an ID which is (directly) associated with a reference RS resource and/or a reference RS resource set.

iii) Alt.3: An ID for a panel may be an ID which is directly associated with a target RS resource (a reference RS resource) and/or a reference RS resource set.

An Alt.3 scheme has an advantage that configured SRS resource set(s) corresponding to one UE Tx panel may be controlled more easily and that the same panel identifier may be allocated to multiple SRS resource sets having a different time domain behavior.

iv) Alt.4: An ID for a panel may be an ID which is additionally configured to spatial relation information (e.g., RRC_SpatialRelationInfo).

An Alt.4 scheme may be a scheme which newly adds information for representing an ID for a panel. In this case, it has an advantage that configured SRS resource sets corresponding to one UE Tx panel may be controlled more easily and that the same panel identifier may be allocated to multiple SRS resource sets having a different time domain behavior.

In an example, a method of introducing an UL TCI similarly to the existing DL TCI (Transmission Configuration Indication) may be considered. Specifically, definition of a UL TCI state may include a list of reference RS resources (e.g., a SRS, a CSI-RS and/or an SSB). A current SRI field may be reused to select a UL TCI state from a configured set or a new DCI field of DCI format 0_1 (e.g., a UL-TCI field) may be defined for a corresponding purpose.

Information related to the above-described panel-specific transmission and reception (e.g., a panel ID, etc.) may be transmitted by higher layer signaling (e.g., a RRC message, MAC-CE, etc.) and/or lower layer signaling (e.g., layer1 (L1) signaling, DCI, etc.). Corresponding information may be transmitted from a base station to a terminal or may be transmitted from a terminal to a base station according to a situation or if necessary.

In addition, corresponding information may be configured by a hierarchical method which configures a set for a candidate group and indicates specific information.

In addition, the above-described identification information related to panel may be configured in a unit of a single panel or in a unit of multiple panels (e.g., a panel group, a panel set).

Sounding Reference Signal (SRS)

In Rel-15 NR, spatialRelationInfo may be used in order for a base station to indicate to a terminal a transmission beam which will be used when transmitting an UL channel. A base station may indicate which UL transmission beam will be used when transmitting a PUCCH and an SRS by configuring a DL reference signal (e.g., an SSB-RI (SB Resource Indicator), a CRI (CSI-RS Resource Indicator) (P/SP/AP: periodic/semi-persistent/aperiodic)) or an SRS (i.e., an SRS resource) as a reference RS for a target UL channel and/or a target RS through a RRC configuration. In addition, when a base station schedules a PUSCH to a terminal, a transmission beam which is indicated by a base station and used for SRS transmission is indicated as a transmission beam for a PUSCH through an SRI field and used as a PUSCH transmission beam of a terminal.

Hereinafter, a SRS for a codebook (CB) and a non-codebook (NCB) will be described.

First, for a CB UL, a base station may first configure and/or indicate transmission of an SRS resource set for 'a CB' to a terminal. In addition, a terminal may transmit any n port SRS resource in a corresponding SRS resource set. A base station may receive a UL channel based on corresponding SRS transmission and use it for PUSCH scheduling of a terminal. Subsequently, a base station may indicate a PUSCH (transmission) beam of a terminal by indicating a SRS resource for 'a CB' which is previously transmitted by a terminal through a SRI field of DCI when performing PUSCH scheduling through UL DCI. In addition, a base station may indicate an UL rank and an UL precoder by indicating an uplink codebook through a TPMI (transmitted precoder matrix indicator) field. Thereby, a terminal may perform PUSCH transmission according to a corresponding indication.

Next, for a NCB UL, a base station may first configure and/or indicate transmission of an SRS resource set for 'a non-CB' to a terminal. In addition, a terminal may simultaneously transmit corresponding SRS resources by determining a precoder of SRS resources (up to 4 resources, 1 port per resource) in a corresponding SRS resource set based on reception of a NZP CSI-RS associated with a corresponding SRS resource set. Subsequently, a base station may indicate a PUSCH (transmission) beam of a terminal and an UL rank and an UL precoder at the same time by indicating part of SRS resources for 'a non-CB' which are previously transmitted by a terminal through an SRI field of DCI when performing PUSCH scheduling through UL DCI. Thereby, a terminal may perform PUSCH transmission according to a corresponding indication.

Hereinafter, an SRS for beam management will be described.

An SRS may be used for beam management. Specifically, UL BM may be performed by beamformed UL SRS transmission. Whether UL BM of an SRS resource set is applied is configured by (a higher layer parameter) 'usage'. When usage is configured as 'BeamManagement (BM)', only one SRS resource may be transmitted to each of a plurality of SRS resource sets in a given time instant. A terminal may be configured with one or more Sounding Reference Symbol (SRS) resource sets configured by (a higher layer parameter) 'SRS-ResourceSet' (through higher layer signaling, e.g., RRC signaling, etc.). For each SRS resource set, UE may be configured with K≥1 SRS resources (a higher layer parameter, 'SRS-resource'). Here, K is a natural number and the maximum value of K is indicated by SRS_capability.

Hereinafter, an SRS for antenna switching will be described.

An SRS may be used for acquisition of DL CSI (Channel State Information) information (e.g., DL CSI acquisition). In a specific example, a BS (Base station) may measure an SRS from UE after scheduling transmission of an SRS to UE (User Equipment) under a situation of a single cell or in multi cells (e.g., carrier aggregation (CA)) based on TDD. In this case, a base station may perform scheduling of a DL signal/channel to UE based on measurement by an SRS by assuming DL/UL reciprocity. Here, regarding SRS-based DL CSI acquisition, an SRS may be configured for antenna switching.

In an example, when following standards (e.g., 3gpp TS38.214), usage of an SRS may be configured to a base station and/or a terminal by using a higher layer parameter (e.g., usage of a RRC parameter, SRS-ResourceSet). Here, usage of a SRS may be configured as usage of beam management, usage of codebook transmission, usage of non-codebook transmission, usage of antenna switching, etc.

Hereinafter, a case in which SRS transmission (i.e., transmission of an SRS resource or an SRS resource set) is configured for antenna switching among the usages will be specifically described.

In an example, for a terminal with partial reciprocity, SRS transmission based on antenna switching (i.e., transmission antenna switching) may be supported for DL (downlink) CSI (Channel State Information) acquisition through SRS transmission under a situation such as TDD (Time Division Duplex). When antenna switching is applied, about 15 us may be generally needed between SRS resources (and/or resources between a SRS resource and a PUSCH/a PUCCH) for antenna switching of a terminal. By considering it, (the minimum) guard period as in the following Table 7 may be defined.

TABLE 7

| $\mu$ | $\Delta f = 2^{\mu} \cdot 15$ [kHz] | Y [Symbol] |
|---|---|---|
| 0 | 15 | 1 |
| 1 | 30 | 1 |
| 2 | 60 | 1 |
| 3 | 120 | 2 |

In Table 7, $\mu$ represents numerology, $\Delta f$ represents subcarrier spacing and Y represents the number of symbols of a guard period, i.e., a length of a guard period. In reference to Table 7, the guard period may be configured based on a parameter $\mu$ which determines numerology. In the guard period, a terminal may be configured not to transmit any other signal and the guard period may be configured to be used fully for antenna switching. In an example, the guard period may be configured by considering SRS resources transmitted in the same slot. In particular, when a terminal is configured and/or indicated to transmit an aperiodic SRS configured by intra-slot antenna switching, a corresponding terminal may transmit an SRS on each designated SRS resource by using a different transmission antenna and the above-described guard period may be configured between each resource.

In addition, as described above, when a terminal is configured with an SRS resource and/or an SRS resource set configured for antenna switching through higher layer signaling, a corresponding terminal may be configured to perform SRS transmission based on UE capability related to antenna switching. In this case, UE capability related to antenna switching may be '1T2R', '2T4R', '1T4R', '1T4R/2T4R', '1T1R', '2T2R', '4T4R', etc. Here, 'mTnR' may mean UE capability which supports m transmission and n reception.

(Example S1) For example, for a terminal which supports 1T2R, up to 2 SRS resource sets may be configured as a different value for resourceType of a higher layer parameter SRS-ResourceSet. In this case, each SRS resource set may have 2 SRS resources transmitted in different symbols and each SRS resource may configure a single SRS port in a given SRS resource set. In addition, an SRS port for a second SRS resource in an SRS resource set may be configured to be associated with a UE antenna port different from an SRS port for a first SRS resource in the same SRS resource set.

(Example S2) In another example, for a terminal which supports 2T4R, up to 2 SRS resource sets may be configured as a different value for resourceType of a higher layer parameter SRS-ResourceSet. Here, each SRS resource set may have 2 SRS resources transmitted in different symbols and each SRS resource may configure 2 SRS ports in a given SRS resource set. In addition, an SRS port pair for a second SRS resource in an SRS resource set may be configured to be associated with a UE antenna port different from an SRS port pair for a first SRS resource in the same SRS resource set.

(Example S3) In another example, for a terminal which supports 1T4R, SRS resource sets may be configured by a different scheme according to whether SRS transmission is configured as periodic, semi-persistent and/or aperiodic. First, when SRS transmission is configured as periodic or semi-persistent, 0 SRS resource set configured or 1 SRS resource set configured with 4 SRS resources based on resourceType of a higher layer parameter SRS-ResourceSet may be configured to be transmitted in different symbols. Here, each SRS resource may configure a single SRS port in a given SRS resource set. In addition, an SRS port for each SRS resource may be configured to be associated with a different UE antenna port. On the other hand, when SRS transmission is configured as aperiodic, 0 SRS resource set configured or 2 SRS resource sets configured with a total of 4 SRS resources based on resourceType of a higher layer parameter SRS-ResourceSet may be configured to be transmitted in different symbols of 2 different slots. Here, a SRS port for each SRS resource in 2 given SRS resource sets may be configured to be associated with a different UE antenna port.

(Example S4) In another example, for a terminal which supports 1T1R, 2T2R, or 4T4R, up to 2 SRS resource sets respectively configured with one SRS resource may be configured for SRS transmission. The number of SRS ports of each SRS resource may be configured to be 1, 2, or 4.

When indicated UE capability is 1T4R/2T4R, a corresponding terminal may expect that the same number of SRS ports (e.g., 1 or 2) will be configured for all SRS resources in SRS resource set(s). In addition, when indicated UE capability is 1T2R, 2T4R, 1T4R, or 1T4R/2T4R, a corresponding terminal may not expect that one or more SRS resource sets configured for antenna switching in the same slot will be configured or triggered. In addition, when indicated UE capability is 1T1R, 2T2R, or 4T4R, a corresponding terminal may not expect that one or more SRS resource sets configured for antenna switching in the same slot will be configured or triggered.

Resource Block

A resource block (RB) is defined as NscRB=12 contiguous subcarriers in a frequency domain.

Point A is a common reference point for a resource block grid. A terminal determines a position of point A with a frequency offset relative to an SS/PBCH or an absolute radio frequency channel number (ARFCN). The frequency offset is configured by a combination of information of master information block (MIB) and system information block 1 (SIB1).

Common resource blocks (CRBs) are a set of resource blocks occupying a channel bandwidth and are defined for each subcarrier interval.

The CRBs are numbered from 0 upwards in a frequency domain for a subcarrier spacing configuration $\mu$. For a subcarrier spacing configuration $\mu$, a center of subcarrier 0 of CRB 0 coincides with 'point A'.

In a frequency domain, a relationship between a number of a CRB nCRB$\mu$ and a resource element (k,l) for a subcarrier spacing configuration $\mu$ is given as nCRB$\mu$=floor (k/NscRB) (floor (x) is the largest integer not greater than x). Where k is defined relative to the point A, such that k=0 corresponds to a subcarrier centered at the point A.

Physical resource blocks (PRBs) are resource blocks belonging to a bandwidth part.

PRBs for a subcarrier spacing configuration $\mu$ are defined within bandwidth part i and are numbered from 0 to NBWP, isize,$\mu$−1 within bandwidth part i. A number of a PRB is determined relative to a number of a CRB, and a relationship between PRB nPRB$\mu$ and CRB nCRB$\mu$ within bandwidth part i is given as nCRB$\mu$=nPRB$\mu$+NBWP,istart,$\mu$. Here, NBWP,istart,$\mu$ is a CRB at which bandwidth part i starts, and is a value relative to CRB 0.

A terminal is allocated virtual resource blocks (VRBs) when receiving a PDSCH or PUSCH resource allocation on a PDCCH. VRBs are then mapped to PRBs.

In the case of an uplink, non-interleaved mapping is always used between a VRBs and actual PRBs. That is, VRB n is mapped to PRB n.

In the case of a downlink, when resource allocation type 0 is used, non-interleaved mapping is always applied between VRBs and actual PRBs. If resource allocation type 1 is used, interleaved or non-interleaved mapping between VRBs and actual PRBs may be applied.

Figure 8:
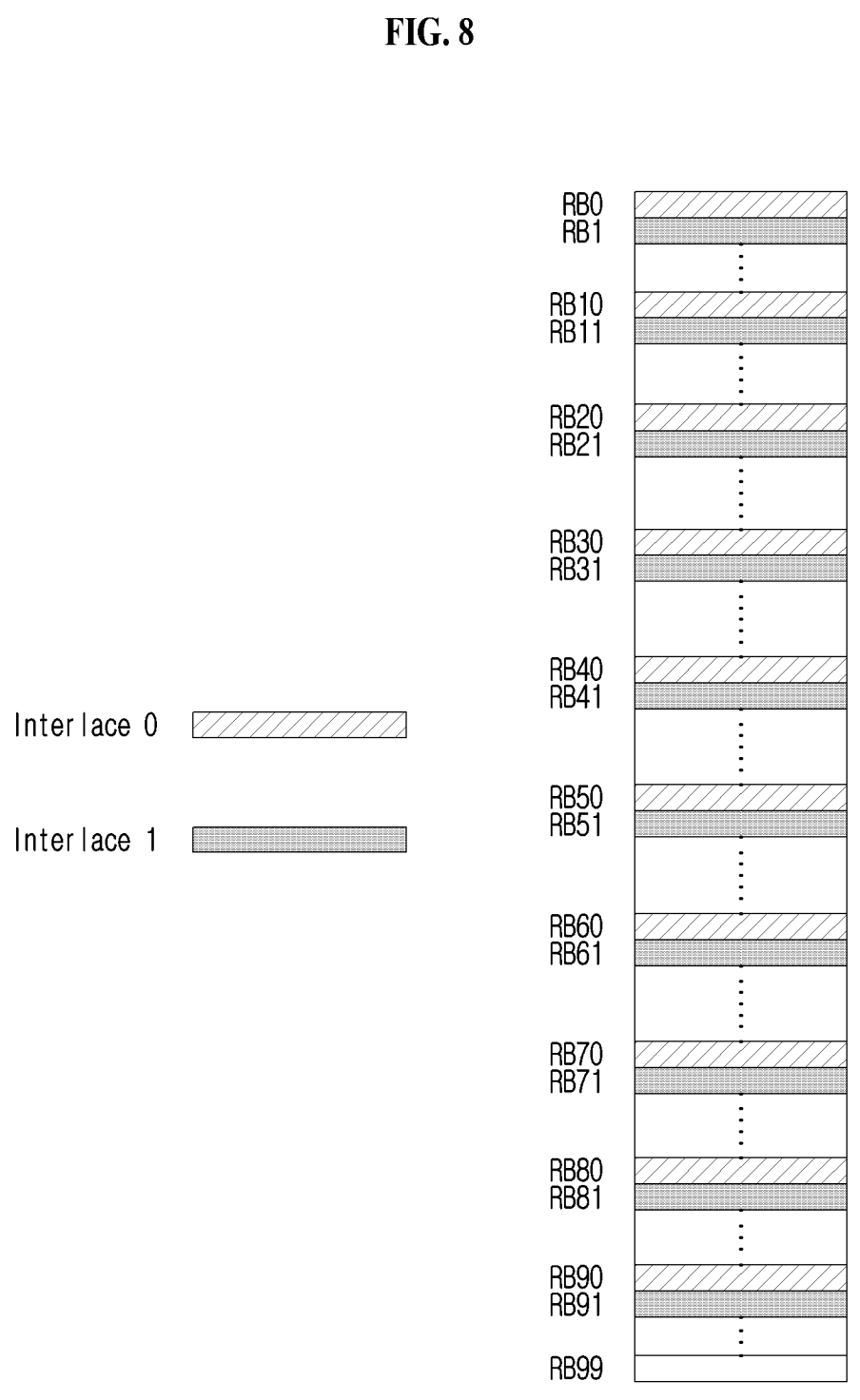

FIG. 8 is a diagram illustrating interlaced resource blocks in a wireless communication system to which the present disclosure may be applied.

For multiple interlaces of resource blocks, an interlace m∈ {0, 1, . . . , M−1} is configured with CRBs {m, M+m, 2M+m, 3M+m, . . . }. Here, m∈ {0, 1, . . . , M−1}, and M is a number of an interlace given in Table 8 below. A relationship between an interlaced resource block nIRB, m$\mu$∈ {0, 1, . . . } in bandwidth part i and an interlace m and a common resource block nCRB$\mu$ is given by Equation 3 below.

$$n^{\mu}_{CRB} = M n^{\mu}_{IRB,m} + N^{start,\mu}_{BWP,i} + \left( \left( m - N^{start,\mu}_{BWP,i} \right) \bmod M \right) \qquad \text{[Equation 3]}$$

In Equation 3, NBWP,istart,μ is a CRB at which bandwidth part i starts, and is a relative value with respect to CRB 0.

In FIG. 8, M is 10, RBs included in a bandwidth part are RB 0 to RB 99, and interlace m is configured with 0 and 1.

Referring to FIG. 8, resource blocks nIRB,mμ for interlace 0 are composed of RBs 0, 10, 20, 30, 40, 50, 60, 70, 80, and 90. Resource blocks nIRB,mμ for interlace 1 are composed of RBs 1, 11, 21, 31, 41, 51, 61, 71, 81, 91. According to Equation 3, nCRBμ is determined based on NBWP,istart, μ.

Table 8 below illustrates numbers of resource block interlaces.

TABLE 8

| μ | M |
|---|---|
| 0 | 10 |
| 1 | 5 |

PUSCH Resource Allocation in Frequency Domain

PUSCH frequency domain resources are allocated using DCI formats 0_0 and 0_1. A terminal determines a resource block assignment in a frequency domain using a resource allocation field (i.e., 'Frequency Domain Resource Assignment' field) in the detected PDCCH DCI.

Type 0, Type 1 and Type 2 uplink resource allocation schemes are supported. Uplink resource allocation type 0 is supported for a PUSCH only when transform precoding is disabled. Uplink resource allocation Type 1 and Type 1 are both supported for a PUSCH when transform precoding is enabled or disabled.

As higher layer parameter 'resourceAllocation' or 'resourceAllocationDCI-0-2' in a configuration for a PUSCH (i.e., push-Config) is set to dynamic switch (dynamicSwitch), if scheduling DCI is configured to indicate an uplink resource allocation type as part of a frequency domain resource grant field, a terminal uses uplink resource allocation type 0 or type 1 indicated by a DCI field. Otherwise, a terminal uses an uplink frequency resource allocation type configured by higher layer parameter 'resourceAllocation' or 'resourceAllocationDCI-0-2'.

If a scheduling PDCCH is received with DCI format 0_1 and if higher layer parameter 'useInterlacePUCCH-PUSCH' is configured in a configuration for a dedicated uplink BWP (i.e., BWP-UplinkDedicated), a terminal assumes that uplink resource allocation type 2 is used.

If a bandwidth part indicator field is not configured in scheduling DCI, or if a terminal does not support changing an activated BWP through DCI, resource block (RB) indexing for uplink resource allocation type 0, type 1 and type 2 is determined within an activated BWP of a terminal. On the other hand, if a bandwidth part indicator field is configured in scheduling DCI and if a terminal supports changing an activated BWP through DCI, RB indexing for uplink resource allocation type 0, type 1 and type 2 is determined within a BWP of a terminal indicated by the bandwidth part indicator field in DCI. When a terminal detects a PDCCH, the terminal first determines an uplink BWP and then determines resource allocation within the corresponding BWP. RB numbering starts from the lowest RB in the determined uplink BWP.

1) Uplink Resource Allocation Type 0

In uplink resource allocation type 0, resource block grant information includes a bitmap indicating resource block groups (RBGs) allocated to a scheduled terminal. That is, frequency resources are allocated in units of RBGs rather than individual RBs. The allocated RBGs may not be contiguous.

An RBG is a set of contiguous virtual resource blocks (VRBs) within a BWP. A size of an RBG is defined by higher layer parameter rbg-Size configured in a configuration for a PUSCH (i.e., push-Config). Higher layer parameter rbg-Size may be set to configuration 1 (config 1) or configuration 2 (config 2).

Table 9 illustrates a size P (i.e., the number of RBs) of an RBG size according to a nominal BWP size and rbg-Size.

TABLE 9

| BWP size | configuration 1 | configuration 2 |
|---|---|---|
| 1-36 | 2 | 4 |
| 37-72 | 4 | 8 |
| 73-144 | 8 | 16 |
| 145-275 | 16 | 16 |

A total number of RBGs (NRBG) for uplink BWP i having a size of NBWP,isize physical resource blocks (PRBs) is given as NRBG=ceil ((NBWP,isize+(NBWP,istartmodP))/P) (ceil(x) is the smallest integer not less than x).

A size of the first RBG is RBG0size=P-NBWP,istart mod P.

If (NBWP,istart+NBWP,isize) mod P>0, a size of the last RBG is RBGlastsize=(NBWP,istart+NBWP,isize) mod P, otherwise P.

A size of all other RBGs is P.

A bitmap is NRBG bits in size, and one bitmap bit corresponds to each RBG. RBGs are indexed in order of increasing frequency of a BWP, starting with the lowest frequency. An order of an RBG bitmap is an order in which RBG 0 to RBGNRBG-1 are sequentially mapped from the most significant bit (MSB) to the least significant bit (LSB) of the bitmap. If a bit value in the bitmap is 1, an RBG corresponding to the corresponding bit is allocated to a terminal, otherwise, an RBG is not allocated to a terminal.

2) Uplink Resource Allocation Type 1

In uplink resource allocation type 1, resource block grant information indicates to a scheduled UE a set of non-interleaved VRBs allocated consecutively within an activated BWP of a size of NBWPsize PRBs. However, when the first BWP having a size of NBWP,0size is used, a case where DCI format 0_0 is decoded in a common search space (CSS) is excluded.

A type 1 uplink resource allocation field includes a starting VRB (RBstart) and a resource indication value (RIV) corresponding to a length LRBs of consecutively allocated VRBs. RIV is defined by Equation 4 below.

$$\text{if } (L_{RBs} - 1) \le \lfloor N_{BWP}^{size}/2 \rfloor \text{ then } RIV = \qquad \text{[Equation 4]}$$
$$N_{BWP}^{size}(L_{RBs} - 1) + RB_{start} \text{ else } RIV =$$
$$N_{BWP}^{size}(N_{BWP}^{size} - L_{RBs} + 1) + (N_{BWP}^{size} - 1 - RB_{start})$$

In Equation 4, LRBs≥1 and does not exceed NBWPsize-RBstart.

In addition, when a scheduling grant is received in DCI format 0_2, an uplink type 1 resource allocation field includes a starting resource block group RBGstart=0, 1, . . . , NRBG−1 and a resource indication value (RIV) corresponding to LRBGs=1, . . . , NRBG length of a virtual contiguously allocated RBGs. Here, if a terminal is configured with higher layer parameter resourceAllocationType1GranularityDCI-0-2, RBGs are defined as P configured by resourceAllocationType1GranularityDCI-0-2, otherwise RBGs are defined as P=1. A resource indication value is defined by Equation 5 below.

$$\text{if } (L_{RBGs}-1) \le \lfloor N_{RBG}/2 \rfloor \text{ then}$$

$$RIV = N_{RBG}(L_{RBGs}-1) + RBG_{start}$$

else $$RIV = N_{RBG}(N_{RBG}-L_{RBGs}+1) + (N_{RBG}-1-RBG_{start}) \quad \text{[Equation 5]}$$

In Equation 5, LRBGs≥1 and does not exceed NRBG-RBGstart.

3) Uplink Resource Allocation Type 2

In type 2 uplink resource allocation, resource block grant information indicates to a terminal up to M interlace index sets (i.e., m∈{0, 1, . . . , M−1}) and, for DCI 0_0 and DCI 0_1 monitored by a USS, a set of maximum NRB-set, ULBWP consecutive RB sets (i.e., one or more RB sets). Here, a unit of RB sets is 20 MHz.

Within an activated UL BWP, an assigned PRB n is mapped to VRB n. For DCI 0_0 and DCI 0_1 monitored by a USS, a terminal determines resource allocation in a frequency domain by an intersection of a union of RBs of indicated interlaces and a set of indicated RB sets (i.e., indicated one or more RB sets) and an intra-cell guard band (if present) between the indicated RB sets. In the case of DCI 0_0 monitored in a CSS, a terminal determines resource allocation in a frequency domain by an intersection of RBs of indicated interlaces and a single uplink RB set of an activated UL BWP. That is, RBs of interlaces indicated in RB sets allocated or configured to a terminal are allocated to a terminal as PUSCH resources.

When μ=0, X=6 most significant bits (MSBs) of resource block allocation information indicate a set m0+1 of interlace indexes allocated to a terminal, where the indication includes RIV. In the case of 0≤RIV≤M (M+1)/2 (1=0,1, . . . ,L−1), RIV corresponds to the number of a starting interlace index m0 and consecutive interlace indexes L (L≥1). RIV is given by Equation 6 below.

$$\text{if } (L-1) \le \lfloor M/2 \rfloor \text{ then}$$

$$RIV = M(L-1) + m_0$$

else $$RIV = M(M-L+1) + (M-1-m_0) \quad \text{[Equation 6]}$$

If RIV≥M(M+1)/2, RIV corresponds to an interlace index m0 and a set 1 of values starting according to Table 10 below.

TABLE 10

| RIV-M(M + 1)/2 | m0 | 1 |
|---|---|---|
| 0 | 0 | {0, 5} |
| 1 | 0 | {0, 1, 5, 6} |
| 2 | 1 | {0, 5} |
| 3 | 1 | {0, 1, 2, 3, 5, 6, 7, 8} |
| 4 | 2 | {0, 5} |
| 5 | 2 | {0, 1, 2, 5, 6, 7} |
| 6 | 3 | {0, 5} |
| 7 | 4 | {0, 5} |

In the case of μ=1, X=5 most significant bits (MSBs) of resource block allocation information indicate interlaces allocated to a scheduled terminal. A bitmap is composed of bits of size M, and one bitmap bit corresponds to per interlace. An order of the interlace bitmap is an order in which interlace 0 to interlace M−1 are mapped from the MSB to the LSB of the bitmap. If a corresponding bit value in the bitmap is 1, an interlace is allocated to a terminal, otherwise, an interlace is not allocated to a terminal.

In the case of DCI 0_0 and DCI 0_1 monitored in a USS for μ=0 and μ=1, Y=ceil (log 2(NRB-set,ULBWP(NRB-set, ULBWP+1)/2)) (ceil(x) is the smallest integer not smaller than x) LSBs of resource block allocation information indicates to a terminal the RB sets contiguously allocated to the terminal for a PUSCH. A resource allocation field is composed of a resource indication value (RIVRB-set). If 0≤RIVRB-set<NRB-set, ULBWP (NRB-set, ULBWP+1)/2, 1 (1=0,1, . . . ,LRB-set-1) RIV corresponds to an starting RB NRB-set, ULstart and the number of consecutive RB sets LRB-set. RIV is defined by Equation 7 below.

$$\text{if } (L_{RB-set}-1) \le \lfloor N_{RB-set,UL}^{BWP}/2 \rfloor \text{ then } RIV_{RB-set} = \quad \text{[Equation 7]}$$

$$N_{RB-set,UL}^{BWP}(L_{RB-set}-1) + N_{RB-set,UL}^{start} \text{ else } RIV_{RB-set} =$$

$$N_{RB-set,UL}^{BWP}\left(N_{RB-set,UL}^{BWP} - L_{RB-set} + 1\right) +$$

$$\left(N_{RB-set,UL}^{BWP} - 1 - N_{RB-set,UL}^{start}\right)$$

In Equation 7, NRB-set, ULstart=0, 1, . . . , NRB-set, ULBWP-1, LRB-set≥1 and does not exceed NRB-set, ULBWP-NRB-set, ULstart.

If transmission precoding is enabled, a terminal transmits a PUSCH on MRBPUSCH PRBs having the lowest index among PRBs indicated by frequency domain resource allocation information. MRBPUSCH is the largest integer not greater than the number of RBs indicated by frequency domain resource allocation information.

Method for Transmitting and Receiving Uplink Signal

Hereinafter, in the present disclosure, "transmission of an SRS resource set" may be used in the same meaning as "transmission of an SRS based on information configured in the SRS resource set". In addition, "transmitting an SRS resource" or "transmitting SRS resources" may be used in the same meaning as "transmitting an SRS or SRSs based on information configured in an SRS resource". In addition, it may be referred to as an additional SRS or an enhanced SRS for an SRS enhanced (or defined) after Rel-17. A UE supporting an additional (enhanced) SRS may be referred to as an additional UE or an enhanced UE. In this regard, a legacy SRS refers to an SRS in which up to 4 symbols can be configured (legacy SRS configuration). And, an enhanced SRS (additional SRS) refers to an SRS in which more than 4 symbols can be configured (enhanced SRS (additional SRS) configuration). This is only for convenience of description and is not intended to limit the technical scope. For example, an SRS in which up to 4 symbols can be configured may be referred to as a first SRS, and an SRS in which more than 4 symbols may be configured may be referred to as a second SRS. Accordingly, a legacy SRS configuration may be referred to as a first SRS configuration and an enhanced SRS (additional SRS) configuration may be referred to as a second SRS configuration.

In NR MIMO Rel-17, it is expected that standardization of an additional (enhanced) SRS supporting more symbols in addition to the existing NR legacy SRS (i.e., up to 4 symbols may be configured as an SRS resource in last 6 symbols in a slot) will be performed. In other words, in order to enhance a capacity and coverage of a NR SRS as below, it is expected that multiple-symbol SRSs will be supported in a time domain space/resource (i.e., in a time domain region exceeding 4 symbols) except for last 6 symbols in a slot.

SRS Enhancement for both FR1 and FR2:

a. Identifies and designates enhancement for aperiodic SRS triggering to promote more flexible triggering and/or a decrease in a DCI overhead/use b. Designates SRS switching for up to 8 antennas (e.g., xTyR, x={1, 2, 4} and y={6, 8})

The following mechanism(s) are evaluated to enhance an SRS capacity and/or coverage and if necessary, are designated: SRS time bundling, increased SRS repetitions, partial sounding across a frequency In this case, more SRS repetitions than R=4, the maximum repetition value of an SRS according to a Rel-15 operation, may be supported. However, in a TDD system, a major goal of a NR, due to a lack of UL slots, there is a limit when a large number of SRS repetitions are configured/indicated to one terminal. Therefore, a method that an SRS coverage is enhanced and UL channel estimation performance is improved by a small number of SRS repetitions is necessary.

Based on such a background, an SRS time domain bundling method which relates/associates an SRS and a UL DMRS is proposed below.

In the present disclosure, '/' may be interpreted as 'and', 'or' or 'and/or' according to a context.

FIG. 9 is a diagram illustrating downlink/uplink transmission timing in a wireless communication system to which the present disclosure may be applied.

FIG. 9(a) illustrates PDSCH and ACK/NACK timing and FIG. 9(b) illustrates PUSCH timing.

In reference to FIG. 9(a), when UE is scheduled to receive a PDSCH, m, a value of a field for assigning a time domain resource of corresponding DCI (i.e., a 'Time domain resource assignment' field), provides m+1, a row index of a predetermined PDSCH resource allocation-related table. Each row in a PDSCH resource allocation-related table defines a slot offset K0, a start and length indicator (SLIV) (or, a direct start symbol S and an allocation length L) and a PDSCH mapping type assumed in PDSCH reception. When UE receives DCI scheduling a PDSCH in slot n, a value of K0 is determined according to a row of a PDSCH resource allocation-related table indicated by m, a 'Time domain resource assignment' field value in corresponding DCI, and slot Ks allocated for a PUSCH is determined based on an index (i.e., n) of a slot that DCI is received and a value of K0.

Values of a field (i.e., a 'PDSCH-to-HARQ_feedback timing indicator' field) for a timing indication of a PDSCH and HARQ feedback in DCI are mapped to values of a set of the number of slots provided by a higher layer parameter (e.g., 'dl-DataToUL-ACK', 'dl-DataToUL-ACK-r16'). In other words, among values of the number of slots provided by a higher layer parameter, a value of the number of specific slots (i.e., K) is determined by a 'PDSCH-to-HARQ feedback timing indicator' field value in DCI and a PUCCH slot carrying ACK/NACK for a PDSCH is transmitted in a slot after K from a PDSCH transmission slot (i.e., slot Ks+K).

In reference to FIG. 9(b), when UE is scheduled by DCI to transmit a transport block in a PUSCH, m, a value of a field for assigning a time domain resource of corresponding DCI (i.e., a 'Time domain resource assignment' field), provides m+1, a row index of a predetermined PUSCH resource allocation-related table. Each row in a PUSCH resource allocation-related table defines a slot offset K2, a start and length indicator (SLIV) (or, a direct start symbol S and an allocation length L), a PUSCH mapping type assumed for PUSCH transmission and the number of repetitions. When UE receives DCI scheduling a PUSCH in slot n, a value of K2 is determined according to a row of a PUSCH resource allocation-related table indicated by m, a 'Time domain resource assignment' field value in corresponding DCI, and slot Ks allocated for a PUSCH is determined based on an index of a slot that DCI is received (i.e., n) and a value of K2.

Hereinafter, in the present disclosure, 'a time domain bundling configuration/indication of an SRS and a DMRS' may be 'an indication which transmits an SRS port and a DMRS port on the same antenna port' and/or 'an indication which transmits an SRS port/resource and a DMRS port/resource with the same spatial relation or spatial domain (transmission) filter'.

In the present disclosure, 'a time domain bundling configuration/indication of an SRS and a DMRS' may be explicitly indicated by higher layer signaling (e.g., RRC signaling, MAC CE) or dynamic signaling (e.g., DCI). In this case, a specific SRS resource (or SRS resource set) and an UL DMRS that time domain bundling is indicated may be identified by signaling. Alternatively, a time domain bundling configuration/indication of an UL DMRS and an SRS may be indirectly indicated by dynamic signaling (e.g., DCI) which is described below. For example, an UL DMRS and an SRS are indicated to be adjacent by an indication of at least one of a PUCCH resource indicator field (PRI) in DCI, a SRS request field and a field for a PUSCH scheduling offset and a timing indication of a PDSCH and HARQ feedback, which may be considered as a time domain bundling indication of a DRMS and an SRS (i.e., interpreted by a terminal as a time domain bundling indication).

In addition, 'a time domain bundling configuration/indication of an SRS and a DMRS' may be configured/indicated by a base station only when frequency domain resource allocation of an SRS and a DMRS is fully or partially overlapped. Alternatively, for a corresponding bundling configuration of a base station, a terminal may perform a terminal operation related to the following time domain bundling only when frequency domain resource allocation of an SRS and a DMRS is fully or partially overlapped.

Proposal A: A base station may perform a SRS time domain bundling configuration/indication so that a terminal transmits an SRS and an UL DMRS adjacent in a time domain. Through a corresponding configuration/indication, when performing UL channel estimation through SRS reception, a base station may use a channel measure result value through UL DMRS reception with a channel estimation result value through SRS reception for UL channel estimation (or, reciprocity-based DL CSI acquisition, i.e., antenna switching).

Hereinafter, in the present disclosure, when the SRS is adjacent to the UL DMRS, it may mean that as SRS and an UL DMRS are respectively configured at a specific position. For example, specifically, an SRS and an UL DMRS may be configured so that each position is based on at least one of the following i) to iii).

i) They are located in the same slot (in this case, an SRS in the same slot may be located in an earlier symbol, and vice versa.)

ii) They are located between adjacent slots (for example, an SRS is located in slot n and an UL DMRS is located in slot n+1, or vice versa.)

iii) The other is located in n symbols/slots from a location of any one of an SRS and an UL DMRS. (e.g., an UL DMRS is located in n symbols/slots from a location of an SRS, or vice versa.)

Here, the value of n may be configured/indicated/updated by a base station. For example, a value of n may be configured/indicated/updated by higher layer signaling (e.g., RRC signaling, MAC CE) or dynamic signaling (e.g., DCI).

In addition, the value of n may be differently configured/indicated/updated based on a channel state. For example, it may be configured/indicated/updated smaller by a base station when a channel is quickly changed by fading and it may be configured/indicated/updated larger by a base station when a channel is stable. There is an advantage of optimizing bundling performance according to a channel state through such an operation.

Effective resource management may be performed under a situation where UL resources (e.g., an UL slot) are insufficient (in a TDD scenario) by reducing the number of repetitions of an SRS through an operation which associates the SRS and UL DMRS.

The SRS may be at least one of an SRS for 'a codebook', for 'a non-codebook', for 'antenna switching' and for 'beam management' (i.e., an SRS resource in an SRS resource set).

Proposal A-1: A base station may use/indicate a PUCCH DMRS as an UL DMRS used for the time domain bundling. In other words, a PUCCH DMRS may be used as an UL DMRS used for the time domain bundling.

The PUCCH DMRS may correspond to at least one of a DMRS of a HARQ ACK/NACK PUCCH and a CSI Reporting PUCCH.

For example, when the PUCCH DMRS is a HARQ ACK/NACK PUCCH, a base station may perform PDSCH scheduling by transmitting DCI format 1_1, non-fallback DL DCI, to a terminal and may indicate a terminal so that a periodic/semi-persistent SRS and an ACK/NACK PUCCH are adjacent through a PUCCH resource indicator (PRI) field in the DCI format. More specifically, a resource position (e.g., a start symbol and a time duration (i.e., the number of symbols)) of a PUCCH carrying ACK information for the PUSCH may be determined in a table which is predetermined by an index calculated based on a PRI value in DCI scheduling the PDSCH. In addition, an SRS resource position (i.e., a start symbol, the number of symbols, a repetition factor, etc. of an SRS resource) may be configured by higher layer signaling per periodic/semi-persistent SRS resource. Accordingly, a base station may indicate a PRI value to a terminal so that a corresponding SRS and a PUCCH DMRS are adjacent based on a resource position of a periodic/semi-persistent SRS configured to a corresponding terminal.

In another example, a base station may perform PDSCH scheduling by transmitting DCI format 1_1 and may indicate a terminal so that an aperiodic SRS and an ACK/NACK PUCCH are adjacent through a PRI field and an SRS request field. More specifically, as described above, a resource position (e.g., a start symbol and a time duration (i.e., the number of symbols)) of a PUCCH carrying HARQ ACK information for the PDSCH may be determined in a table which is predetermined by an index calculated based on a PRI value in DCI scheduling the PDSCH. In addition, an aperiodic SRS resource set may be triggered by an SRS request field in DCI scheduling the PDSCH and in this case, an SRS resource set means a set of one or more SRS resources. A slot offset from triggering DCI may be configured per each SRS resource in an SRS resource set by higher layer signaling and in addition, as described above, an SRS resource position (i.e., a start symbol, the number of symbols, a repetition factor, etc. of an SRS resource) may be configured. Accordingly, a base station may indicate a PRI value and/or an SRS request field value to a terminal so that a corresponding SRS and a PUCCH DMRS are adjacent.

In addition, scheduling may be performed so that a periodic/semi-persistent SRS and a PUCCH DMRS are adjacent through an indication by a field for a timing indication of a PDSCH and a HARQ feedback in DCI scheduling a PDSCH (i.e., a 'PDSCH-to-HARQ_feedback timing indicator' field). And/or, a base station may indicate a PRI value and/or an SRS request field value to a terminal so that a corresponding SRS and a PUCCH DMRS are adjacent.

In addition, a spatial relation of an ACK/NACK PUCCH adjacent to an SRS (e.g., a spatial domain Tx filter/coefficient) and/or a precoder of a terminal may be configured/indicated/updated to be the same as an SRS by the PRI field. Alternatively, for example, one or more precoders may be configured by RRC signaling and a specific precoder of the one or more precoders may be indicated by DCI scheduling the PDSCH. In addition, when one or more precoders configured by RRC signaling need to be updated/modified, it may be updated by a MAC control element (CE). As it configures/activates/indicates SRS and PUCCH transmission utilizing the same spatial relation information or/and precoder, a base station may perform accurate UL channel estimation and enhance UL coverage based on an association with an UL DMRS despite a configuration/an indication of a small number of SRS repetitions.

Specifically, for example, the SRS may be at least one of an SRS for 'a codebook' or for 'beam management' (i.e., a 1-port SRS resource in an SRS resource set). In addition, the same spatial relation (e.g., a spatial domain Tx filter/coefficient) or/and terminal precoder as a corresponding SRS resource may be indicated by the PRI field, and based on it, a terminal may perform (1-port) ACK/NACK PUCCH transmission. In other words, a precoder of an ACK/NACK PUCCH which traditionally depends on terminal implementation may be configured/indicated/updated by a base station to be the same as a precoder of the SRS resource. Alternatively, only when SRS time domain bundling in this proposal is configured/indicated by a base station, a precoder of the PUCCH may be configured/indicated to be the same as the SRS.

In another example, when the PUCCH DMRS is a CSI reporting PUCCH, a base station may configure/activate/indicate transmission of a periodic/semi-persistent/aperiodic SRS to be adjacent to a corresponding CSI reporting PUCCH when a CSI reporting PUCCH is transmitted by a terminal while having a periodic/semi-persistent property. In this case, the SRS may be at least one of an SRS for 'a codebook' or for 'beam management' (a 1-port SRS resource in a resource set). In addition, as in the same as the above-described example, a spatial relation (e.g., a spatial domain Tx filter/coefficient) and/or a terminal precoder of a CSI reporting PUCCH may be configured/indicated/updated to be the same as the SRS. Alternatively, only when SRS time domain bundling in this proposal is configured/indicated by a base station, a precoder of the PUCCH may be configured/indicated to be the same as the SRS.

In other words, this embodiment proposes the following terminal/base station operation. A base station may perform a time domain bundling configuration/indication of the SRS and a (PUCCH) DMRS for a terminal. A terminal may operate as follows by a corresponding time domain bundling configuration/indication. A terminal may use spatial relation information for a bundled SRS as spatial relation information of a (PUCCH) DMRS by ignoring (or replacing) spatial relation-related information which is preconfigured for the (PUCCH) DMRS by RRC/MAC CE signaling.

Proposal A-2: A base station may use/indicate a PUSCH DMRS as an UL DMRS used for the time domain bundling. In other words, a PUSCH DMRS may be used as an UL DMRS used for the time domain bundling.

For example, a base station may perform PUSCH scheduling by transmitting DCI format 0_1, non-fallback UL DCI, for a terminal and may perform uplink scheduling by a PUSCH scheduling offset indication so that a periodic/semi-persistent SRS and a PUSCH are adjacent. More specifically, scheduling may be performed so that a periodic/semi-persistent SRS and a PUSCH DMRS are adjacent through an indication by a field for assigning a time domain resource in DCI scheduling a PUSCH (i.e., a 'Time domain resource assignment' field).

In another example, a base station may perform PUSCH scheduling by transmitting DCI format 0_1 and may indicate a terminal so that an aperiodic SRS and a PUSCH are adjacent through an SRS request field. More specifically, an aperiodic SRS resource set may be triggered by an SRS request field in DCI scheduling the PDSCH and in this case, an SRS resource set means a set of one or more SRS resources. A slot offset from triggering DCI may be configured per each SRS resource in an SRS resource set by higher layer signaling and in addition, as described above, an SRS resource position (i.e., a start symbol, the number of symbols, a repetition factor, etc. of an SRS resource) may be configured. Accordingly, a base station may indicate an SRS request field value to a terminal so that a corresponding SRS and a PUSCH DMRS are adjacent. And/or, a base station may perform scheduling so that an aperiodic SRS and a PUSCH DMRS are adjacent through an indication by a field for assigning a time domain resource in DCI scheduling a PUSCH (i.e., a 'Time domain resource assignment' field).

There may be a limit that the periodic/semi-persistent/aperiodic SRS and the PUSCH for the time domain bundling configuration/indication have the same spatial relation. Alternatively, according to a time domain bundling configuration/indication of the SRS and a (PUSCH) DMRS, a terminal may operate as follows. A terminal may use spatial relation information for a bundled SRS as spatial relation information of a (PUSCH) DMRS by ignoring (or replacing) spatial relation-related information which is preconfigured/indicated in a (PUSCH) DMRS by MAC/CE signaling and DCI.

Specifically, for example, the SRS may be at least one of a SRS for 'a codebook' or for 'a nonCodebook' (i.e., n-port (n is a natural number) SRS resources in an SRS resource set). More specifically, i) when the SRS is used for 'a codebook', the number of ports of the SRS resource may be configured/indicated to be the same as the number of ranks of the scheduled PUSCH, and ii) when the SRS is used for 'a nonCodebook', the same number of 1-port SRS resources as the number of ranks of the PUSCH may be configured in a SRS resource set for 'a nonCodebook'.

Alternatively, when SRS time domain bundling of this proposal is configured/indicated by a base station, the existing configuration of a SRS resource set configured for the 'codebook' or for a 'nonCodebook' may be overridden and a terminal may i-1) transmit an SRS resource having the same number of ports as the number of ranks of the scheduled PUSCH (for 'a codebook') or ii-1) may transmit the same number of 1-port SRS resources as the number of ranks of the PUSCH (for 'a nonCodebook'). In particular, for the SRS resource set configured for 'a nonCodebook', according to an SRS time domain bundling configuration/indication of this proposal, a terminal may operate as follows. A terminal may transmit an SRS by using the same precoding vector(s) as a PUSCH DMRS bundled as a transmission precoding vector of each 1-port SRS resource in transmitting an SRS resource set for 'a nonCodebook' (so that an SRS port index and a DMRS port index have a one-to-one correspondence). It is to perform time bundling by using a precoder used for n-rank PUSCH transmission for SRS resources for 'a nonCodebook'. Specifically, for non-codebook-based PUSCH transmission, a base station may schedule n-rank PUSCH transmission by indicating n specific SRS resources (of up to 4 SRS resources) in an SRS resource set for 'a nonCodebook' transmitted by a terminal before PUSCH transmission through an SRS resource indicator (SRI) field of UL grant DCI scheduling a corresponding PUSCH. In this case, when SRS resources for 'a nonCodebook' bundled with a PUSCH precoder are used as they are, it means that SRS precoding vectors used in transmitting n SRS resources indicated through an SRI field of the UL grant DCI is used as it is. In other words, traditionally, a terminal itself calculates to which precoder it will transmit an SRS resource for 'a nonCodebook' (by a base station configuration), but according to the operation, it may be interpreted that precoding vectors used when transmitting SRS resources for a previous 'nonCodebook' are used as they are when transmitting subsequent SRSs.

Through the above-described operation, a spatial relation and a precoder of an adjacent SRS and PUSCH DRMS may be transmitted equally. A base station may measure a channel state from a PUSCH DMRS which is actually received by using a pre-recognized (pre-configured/indicated) PUSCH DMRS sequence. Accordingly, this embodiment has an advantage to improve SRS reception performance by utilizing measurement of a PUSCH DMRS for SRS channel estimation.

ii) of the proposal A-2. When the SRS is for 'a nonCodebook', the following two methods may be applied as another example.

ii-2) When an SRS (resource set) for 'a nonCodebook' used for SRS time domain bundling is bundled with a PUSCH DMRS, a terminal may transmit as many PUSCH DMRSs as the number of 1-port SRS resources in an SRS resource set for a corresponding 'nonCodebook' when a base station configures/indicates an SRS time domain bundling operation to a terminal. For example, when the number of PUSCH DMRS ports indicated in UL DCI is 1 (e.g., port 0) and the number of SRS resources configured in an SRS resource set for a 'nonCodebook' to be bundled with a corresponding PUSCH DMRS is 4, a terminal transmits a rank 1 PUSCH to a PUSCH DMRS (port 0) indicated by corresponding DCI and performs rate matching for DMRS ports (in the example, port 1, 2, 3) which are not used as a PUSCH DMRS among (4) DMRS ports (e.g., port 0, 1, 2, 3) mapped one-to-one to (4) SRS resources for a 'nonCodebook'. As a result, it may be understood that port 0 (i.e., a DMRS of port 0) corresponds to an actual DMRS (port) for PUSCH transmission of a terminal and port 1, 2, 3 (i.e., a DMRS of port 1, 2, 3) is not used for PUSCH transmission, but is used to improve SRS channel estimation performance (for a 'nonCodebook') (or, a DMRS of port 0 may be used to improve SRS channel estimation performance). For the ii-1 operation overriding the existing configuration of the SRS resource set, when as many SRS resources in an SRS resource set (for a 'nonCodebook') as the number of DMRS ports configured/indicated for a PUSCH are transmitted, it may be effective in improving channel estimation performance only for as many SRS resources as the number of DMRS ports and it may be ineffective in improving channel estimation performance for remaining SRS resources. On the other hand, according to the ii-2 operation, by overcoming a disadvantage in i-1, it may be expected to improve channel estimation performance in all SRS resources. However, the ii-2 method may have a disadvantage that a DMRS overhead of a terminal increases.

ii-3) When SRS time domain bundling is configured/indicated by a base station, a terminal may perform an operation in the ii-1 (e.g., as many SRS resources in an SRS resource set (for a 'nonCodebook') as the number of DMRS ports are transmitted) by overriding the existing configuration of an SRS resource set configured for a 'nonCodebook'. In addition, an SRS resource may be transmitted while performing cycling so that an SRS resource in an SRS resource set (for a 'nonCodebook') transmitted at every PUSCH+SRS transmission occasion (TO) of a terminal that time domain bundling is performed is different. In other words, an operation that a terminal transmits an SRS while changing an SRS resource combination in an SRS resource set (for a 'nonCodebook') targeted for time domain bundling at every (PUSCH+SRS) TO (according to a time) is proposed. For example, a method that a terminal performs transmission by bundling a rank n PUSCH and the first to the n-th SRS resources in an SRS resource set (for a 'nonCodebook') at a first TO and by bundling a rank m PUSCH and the (n+1)-th to the (n+m)-th SRS resources in a SRS resource set (for a 'nonCodebook') at a second TO may be considered. As above, as a method that an SRS resource subject to time domain bundling per TO is determined and a first SRS resource is re-selected after a last SRS resource in a corresponding SRS resource set, an SRS resource may be cyclically selected in a corresponding SRS resource set.

Through such an operation, a base station may expect an effect of CE performance improvement for all SRS resources in an SRS resource set (for a 'nonCodebook') from a plurality of TOs (according to the passage of time). Of course, the operation needs to perform a DMRS port indication to a terminal to be the same as a port index of a cycled SRS resource when a base station indicates a PUSCH DMRS port for DCI in PUSCH scheduling. In other words, a different PUSCH DMRS port indication may be performed by a base station per PUSCH TO. Alternatively, according to a PUSCH DMRS port indication in UL DCI of a base station, a terminal may cycle and transmit an SRS resource so that a port of a (1-port) SRS resource corresponds to a PUSCH DMRS port indicated in DCI when transmitting an SRS resource in a bundled SRS resource set (for a 'nonCodebook').

The ii-3 operation may be utilized/applied in M-TRP PUSCH transmission. In an example, in SDM M-TRP PUSCH transmission dividing an uplink layer per TRP, an SRS time domain bundling operation may be configured/indicated to a terminal. In this case, only with a configuration that each TRP divides SRS resources in an SRS resource set (for a 'nonCodebook'), a bundling operation of a PUSCH DMRS and an SRS resource (for a 'nonCodebook') may be performed. A DMRS port of the M-TRP PUSCH and the SRS resource (for a 'nonCodebook') may have a one-to-one correspondence relation according to which TRP the SRS resource is directed to (or according to a related configuration/indication). In addition, when a corresponding DMRS port and the SRS resource (for a 'nonCodebook') are bundled and transmitted by a terminal, a base station may improve SRS channel estimation performance per TRP. In addition, for TDM M-TRP PUSCH transmission, when a base station configures/indicates bundling of a PUSCH towards to each TRP and an SRS to a terminal, the ii-3 operation may be applied.

Proposal B: In the proposal A-1 and A-2, for equivalent association of an SRS and an UL DMRS, a pre-configuration of a base station may be performed so that an (open-loop (OL)/closed-loop (CL)) power control configuration/indication of an SRS (resource set) is the same as an (OL/CL) power control configuration/indication of a UL (PUCCH/PUSCH) DMRS.

Alternatively, according to a time domain bundling configuration/indication of the SRS and a (PUCCH/PUSCH) DMRS, a terminal may operate as follows. A terminal may operate according to an (OL/CL) power control configuration of an SRS by ignoring (or overriding) the existing configuration for a PUCCH/PUSCH (OL/CL) power control configuration. Alternatively, for a power control process of two channels/RSs (reference signal) of an SRS and a PUCCH/a PUSCH targeted for time domain bundling, a configuration/an indication on whether to follow power control of an SRS or power control of a PUCCH/a PUSCH may be preceded in advance by a base station. Specifically, for a pathloss reference RS (and/or a coefficient alpha value for pathloss compensation), an OL power control parameter configured in each UL channel/RS for pathloss compensation in uplink transmission, a base station/a terminal may operate as follows. A base station performs a time domain bundling configuration/indication of the SRS and a (PUCCH/PUCCH) DMRS. According to a corresponding bundling configuration/indication, a terminal may ignore (or override) a pathloss reference RS which is pre-configured in a PUCCH/a PUSCH and perform pathloss compensation by utilizing a pathloss reference RS (and/or an alpha value) configured in an SRS to transmit a corresponding channel. Alternatively, for a pathloss reference RS (and/or an alpha value) of two channels/RSs of a PUCCH/a PUSCH and an SRS targeted for time domain bundling, a pre-configuration/indication of a base station on whether to follow a configuration of an SRS or a configuration of a PUCCH/a PUSCH may be preceded. Based on a corresponding configuration/indication, a terminal may compensate pathloss according to an SRS configuration or a PUCCH/PUSCH configuration.

An operation of the proposal A-1 and A-2 may be configured to be on/off (i.e., activated/deactivated) for a terminal operation by a different RRC enabler or an integrated RRC enabler.

The proposal A-1/proposal A-2/i/ii/i-1/ii-1/ii-2/ii-3/proposal B may be respectively performed by an independent operation or may be applied/utilized by a base station-terminal operation with a combination of a specific suggestion/operation.

Figure 10:
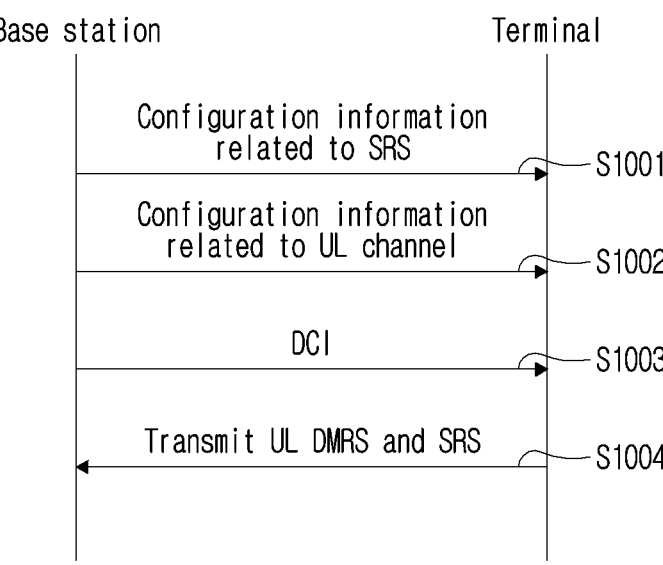
FIG. 10 is a diagram illustrating a signaling procedure between a base station and a terminal for a method for transmitting and receiving an uplink signal according to an embodiment of the present disclosure.

FIG. 10 is a diagram illustrating a signaling procedure between a base station and a terminal for a method of transmitting and receiving an uplink signal according to an embodiment of the present disclosure.

FIG. 10 illustrates a signaling procedure between a base station and a terminal based on the above-proposed suggestion A (proposal A-1/proposal A-2/i/ii/i-1/ii-1/ii-2/ii-3) to proposal B. An example in FIG. 10 is for convenience of description, and it does not limit a scope of the present disclosure. Some step(s) illustrated in FIG. 10 may be omitted according to a situation and/or a configuration. In addition, in FIG. 10, a base station and a terminal are just one example, and may be implemented by an apparatus illustrated in the following FIG. 13. For example, a processor 102/202 of FIG. 13 may control to transmit and receive a channel/a signal/data/information, etc. (e.g., SRS-related configuration information, UL channel-related configuration information, DCI for UL/DL scheduling, an additional SRS, a PDCCH, a PDSCH, a PUSCH, a PUCCH, a PHICH, etc.) by using a transceiver 106/206 and may control to store a channel/signal/data/information, etc. to be transmitted or received in a memory 104/204.

In reference to FIG. 10, a base station (BS) may transmit SRS-related configuration information to user equipment (UE) (S1001). In other words, UE may receive SRS-related configuration information from a base station.

Here, SRS-related configuration information may include configuration information related to SRS transmission, configuration information on one or more SRS resource sets (i.e., N (N is a natural number) SRS resource sets), etc., and each SRS resource set may include one or more SRS resources, and accordingly, configuration information may include configuration information on one or more SRS resources.

In addition, SRS-related configuration information may include a usage value per SRS resource set (or per SRS resource). In this case, usage may include a codebook, a non-codebook, beam management, antenna switching or/and positioning, etc.

In addition, SRS-related configuration information may include time domain behavior (i.e., periodical transmission, aperiodic transmission, semi-persistent transmission) information per SRS resource set (or per SRS resource).

In addition, SRS-related configuration information may include precoder information and/or spatial relation information (e.g., a spatial domain Tx filter/a coefficient) per SRS resource set (or SRS resource). In addition, it may include a power control configuration of an open loop and/or a closed loop per SRS resource set (or SRS resource).

A base station (BS) may transmit UL channel-related configuration information to user equipment (UE) (S1002). In other words, UE may receive UL channel-related configuration information from a base station.

Here, an UL channel may be a PUCCH and/or a PUSCH.

UL channel-related configuration information may include precoder information and/or spatial relation information (e.g., a spatial domain Tx filter/a coefficient) of a corresponding UL channel (or a DRMS of a corresponding UL channel). In addition, UL channel-related configuration information may include a power control configuration of an open loop and/or a closed loop for a corresponding UL channel (or a DRMS of a corresponding UL channel).

A base station (BS) transmits DCI which triggers transmission of an SRS in one or more SRS resources in an SRS resource set configured to UE (i.e., a specific SRS resource of one or more SRS resource sets) to UE (S1003).

Here, DCI may schedule a PDSCH or may schedule a PUSCH.

In addition, DCI may indicate time domain bundling between the SRS and an uplink DMRS. In this case, an indication of time domain bundling between the SRS and an uplink DMRS may be an indication that the SRS and the uplink DMRS are transmitted on the same antenna port and/or with the same spatial domain transmission filter.

As described above, DCI may explicitly indicate the time domain bundling, or may indirectly/implicitly indicate the time domain bundling by indicating that a position between the SRS and an uplink DMRS is adjacent (i.e., it is located in a specific range in a time domain). Here, the specific range may include the same slot, a consecutive slot, n (n is a natural number) symbols and n (n is a natural number) slots.

A terminal transmits an uplink channel DMRS and the SRS in the one or more SRS resources to the base station (S1004).

A terminal may transmit the SRS and the uplink DMRS to a base station according to the time domain bundling indication. Here, an uplink DMRS may be transmitted temporarily before an SRS, or an SRS may be transmitted temporarily before an uplink DMRS.

The uplink DMRS subject to time domain bundling with the SRS may be a DMRS of a PUCCH carrying CSI or a DMRS of a PUCCH carrying ACK information (i.e., HARQ ACK) on a PDSCH scheduled by the DCI. In this case, as the uplink DMRS and the SRS are indicated to be located in the specific range in a time domain by an SRS request field and/or a PRI field in the DCI, time domain bundling between the SRS and the uplink DMRS may be indicated. In addition, in this case, precoder and/or spatial relation information for transmission of the SRS may be used for transmission of the uplink DMRS. In other words, precoder and/or spatial relation information configured for transmission of an uplink DMRS may be replaced with precoder and/or spatial relation information for transmission of the SRS.

The uplink DMRS subject to time domain bundling with the SRS may be a DMRS of a PUSCH scheduled by the DCI. In this case, as the uplink DMRS and the SRS are indicated to be located in the specific range in a time domain by a scheduling offset indication of the PUSCH by the DCI, time domain bundling between the SRS and the uplink DMRS may be indicated. In addition, in this case, spatial relation information for transmission of the SRS may be used for transmission of the uplink DMRS. In other words, spatial relation information configured for transmission of an uplink DMRS may be replaced with spatial relation information for transmission of the SRS. In addition, a precoder for transmission of the uplink DMRS may be used for transmission of the SRS. In addition, when the SRS resource set is configured for a codebook, the number of antenna ports of the one or more SRS resources may be configured the same as the number of ranks of the PUSCH. In addition, when the SRS resource set is configured for a non-codebook, the number of the one or more SRS resources in the SRS resource set may be configured the same as the number of ranks of the PUSCH. Here, one or more different SRS resources in the SRS resource set may be transmitted per transmission occasion of the time domain bundling. For example, a combination of SRS resources in the SRS resource set at a transmission occasion may be cyclically determined.

In addition, the same power control configuration of open loop and/or closed loop may be configured for the SRS and the uplink DMRS. Alternatively, a power control configuration of an open loop and/or closed loop for transmission of the SRS may be used for transmission of the uplink DMRS. In addition, whether the same power control configuration of open loop and/or closed loop between the SRS and the uplink DMRS will follow a power control configuration for an SRS or a power control configuration for the uplink DMRS may be configured by the base station. In this case, which power control configuration is followed may be configured by the SRS-related configuration information or uplink channel-related configuration information or may be indicated by dynamic signaling (e.g., DCI, etc.).

As described above, in NR MIMO Rel-17, in addition to the existing NR legacy SRS (i.e., up to 4 symbols within the last 6 symbols in a slot can be configured as SRS resources), it is expected that standardization of an additional (enhanced) SRS supporting a larger number of symbols will proceed.

In relation to standards up to current Rel-16, when configuring/activating/indicating SRS transmission of a base station, since a frequency domain resource configuration for a terminal to perform sounding is performed through RRC level/layer signaling (through RRC parameter(s)), there is a disadvantage in that it is difficult for a base station to dynamically perform a sounding indication in a specific frequency domain to a terminal. In order to accurately perform dynamic/low-latency DL or UL channel acquisition of a base station, a method of dynamically indicating frequency domain resource allocation for a corresponding SRS when configuring/activating/indicating transmission of an SRS to a terminal may be required.

Hereinafter, a frequency domain resource allocation method for Rel-15 SRS will be described.

When an SRS is transmitted in a given SRS resource, for each OFDM symbol and for each antenna port of an SRS resource, a sequence r(pi)(n,l') is multiplied by an amplitude scaling factor to match specified transmit power. And, starting from r(pi)(0, 1') according to Equation 8 below, it is sequentially mapped to resource elements (k, l) in a slot for each antenna port pi.

[Equation 8]

$$a_{K_{TC}k'+k_0^{(p_i)},l'+l_0}^{(p_i)} =$$

$$\begin{cases} \dfrac{1}{\sqrt{N_{ap}}}\beta_{SRS}r^{(p_i)}(k', l') & k' = 0, 1, \ldots , M_{sc,b}^{SRS} - 1 \; l' = 0, 1, \ldots , N_{symb}^{SRS} - 1 \\ 0 & \text{otherwise} \end{cases}$$

A length of a sounding reference signal (SRS) sequence is given as Msc,bSRS=mSRS,b·NscRB/KTC. Here, mSRS,b is given by a row of Table 9 selected with b=Bsrs. Here, Bsrs∈{0,1,2,3} is given by a b-SRS field included in a higher layer parameter ('freqHopping') for frequency hopping, if configured, otherwise Bsrs=0. A row of Table 9 are selected according to an index CSRS∈{0,1, . . . ,63} given by a c-SRS field included in a higher layer parameter ('freqHopping') for frequency hopping.

A frequency domain start position k0(pi) is defined as in Equation 9 below.

[Equation 9]

$$k_0^{(p_i)} = \bar{k}_0^{(p_i)} + \sum_{b=0}^{B_{SRS}} K_{TC}M_{sc,b}^{SRS}n_b \text{ where } \bar{k}_0^{(p_i)} = n_{shift}N_{sc}^{RB} + \left(k_{TC}^{(p_i)} + k_{offset}^{l'}\right) \text{mod } K_{TC}$$

$$k_{TC}^{(p_i)} = \begin{cases} (k_{TC} + K_{TC}/2) \text{ mod } K_{TC} & \text{if } n_{SRS}^{cs} \in \{N_{SRS}^{cs,max}/2, \ldots , n_{SRS}^{cs,max} - 1\} \text{ and } N_{ap}^{SRS} = 4 \text{ and } p_i \in \{1001, 1003\} \\ \bar{k}_{TC} & \text{otherwise} \end{cases}$$

Referring to Equation 9, if NBWPstart≤nshift, a reference point for k0(pi) is subcarrier 0 in common resource block 0, otherwise, a reference point in a BWP is the lowest subcarrier. And, if an SRS is configured by an information element (IE) for an SRS position ('SRS-for-positioning'), koffsetl' is given by a predefined table, otherwise koffsetl'=0. In addition, a frequency domain shift value nshift adjusts an SRS assignment with respect to a reference point grid, and is included in a higher layer parameter ('freqDomainShift') for a frequency domain shift in an IE for an SRS-related configuration ('SRS-Config') or an IE for an SRS location ('SRS-for-positioning'). A transmission comb offset is as shown in Equation 10 below, and is included in a higher layer parameter ('transmissionComb') for a transmission comb in an IE for an SRS-related configuration ('SRS-Config') or an IE for an SRS location ('SRS-for-position-ing'). And, Nb is a frequency location index.

$$\bar{k}_{TC} \in \{0,1, \ldots ,K_{TC}-1\} \qquad \text{[Equation 10]}$$

When configured, a frequency hopping of an SRS is configured by a parameter bhop ∈ {0,1,2,3} given by a b-hop field included in a higher layer parameter ('freqHopping') for frequency hopping, otherwise bhop=0.

If bhop≥BSRS, frequency hopping is disabled, a frequency location index nb remains constant (unless it is reconfigured), and is defined as Equation 11 below for all NsymbSRS OFDM symbols of an SRS resource.

$$n_b = \lfloor 4n_{RRC}/M_{SRS,b} \rfloor \bmod N_b \qquad \text{[Equation 11]}$$

A quantity nRRC, if configured, is given by a higher layer parameter for frequency domain position ('freqDomainPosition'), otherwise nRRC=0. Valued of mSRS,b and Nb for b=BSRS are given by a selected row of Table 12 below corresponding to configured CSRS value.

If bhop<BSRS, frequency hopping is enabled and a frequency location index nb is defined by Equation 12 below.

$$n_b = \begin{cases} \lfloor 4n_{RRC}/m_{SRS,b} \rfloor \bmod N_b & b \le b_{hop} \\ (F_b(n_{SRS}) + \lfloor 4n_{RRC}/m_{SRS,b} \rfloor) \bmod N_b & \text{otherwise} \end{cases} \qquad \text{[Equation 12]}$$

Referring to Equation 12, Nb is given by Table 12 below, and Fb (nSRS) is determined as Equation 13.

$$\text{[Equation 13]}$$

$$F_b(n_{SRS}) =$$

$$\begin{cases} (N_b/2) \left\lfloor \dfrac{n_{SRS} \bmod \prod_{b'=b_{hop}}^{b} N_{b'}}{\prod_{b'=b_{hop}}^{b-1} N_{b'}} \right\rfloor + \left\lfloor \dfrac{n_{SRS} \bmod \prod_{b'=b_{hop}}^{b} N_{b'}}{2\prod_{b'=b_{hop}}^{b-1} N_{b'}} \right\rfloor & \text{if } N_b \text{ even} \\ \lfloor N_b/2 \rfloor \left\lfloor n_{SRS}/\prod_{b'=b_{hop}}^{b-1} N_{b'} \right\rfloor & \text{if } N_b \text{ odd} \end{cases}$$

In Equation 13, Nbhop=1 regardless of a value of Nb. A quantity nSRS counts a number of SRS transmissions. In the case of an SRS resource configured as aperiodic by a higher layer parameter ('resourceType') for a resource type, it is given by nSRS-floor (l'/R) (floor (x) is the largest integer not greater than x) in a slot in NsymbSRS symbols in which an SRS resource is transmitted. A quantity R≤NsymbSRS, if configured, is a repetition factor given by a repetition factor ('repetitionFactor') field included in a higher layer parameter ('resourceMapping') for resource mapping, otherwise R=NsymbSRS.

In the case of an SRS resource configured as periodic or semi-persistent by a higher layer parameter ('resourceType') for a resource type, an SRS counter is calculated by Equation 14 below for a slot satisfying Equation 15 below.

$$n_{SRS} = \left( \frac{N_{slot}^{frame,\mu} n_f + n_{s,f}^{\mu} - T_{offset}}{T_{SRS}} \right) \left( \frac{N_{symb}^{SRS}}{R} \right) + \left\lfloor \frac{l'}{R} \right\rfloor \qquad \text{[Equation 14]}$$

$$\left( N_{slot}^{frame,\mu} n_f + n_{s,f}^{\mu} - T_{offset} \right) \bmod T_{SRS} = 0 \qquad \text{[Equation 15]}$$

A period TSRS of slots and a slot offset Toffset are given according to a predefined standard.

Table 11 illustrates SRS bandwidth configurations.

TABLE 11

| Csrs | BSRS = 0 | | BSRS = 1 | | BSRS = 2 | | BSRS = 3 | |
|---|---|---|---|---|---|---|---|---|
| | mSRS, 0 | N0 | mSRS, 1 | N1 | mSRS, 2 | N2 | mSRS, 3 | N3 |
| 0 | 4 | 1 | 4 | 1 | 4 | 1 | 4 | 1 |
| 1 | 8 | 1 | 4 | 2 | 4 | 1 | 4 | 1 |
| 2 | 12 | 1 | 4 | 3 | 4 | 1 | 4 | 1 |
| 3 | 16 | 1 | 4 | 4 | 4 | 1 | 4 | 1 |
| 4 | 16 | 1 | 8 | 2 | 4 | 2 | 4 | 1 |
| 5 | 20 | 1 | 4 | 5 | 4 | 1 | 4 | 1 |
| 6 | 24 | 1 | 4 | 6 | 4 | 1 | 4 | 1 |
| 7 | 24 | 1 | 12 | 2 | 4 | 3 | 4 | 1 |
| 8 | 28 | 1 | 4 | 7 | 4 | 1 | 4 | 1 |
| 9 | 32 | 1 | 16 | 2 | 8 | 2 | 4 | 2 |
| 10 | 36 | 1 | 12 | 3 | 4 | 3 | 4 | 1 |
| 11 | 40 | 1 | 20 | 2 | 4 | 5 | 4 | 1 |
| 12 | 48 | 1 | 16 | 3 | 8 | 2 | 4 | 2 |
| 13 | 48 | 1 | 24 | 2 | 12 | 2 | 4 | 3 |
| 14 | 52 | 1 | 4 | 13 | 4 | 1 | 4 | 1 |
| 15 | 56 | 1 | 28 | 2 | 4 | 7 | 4 | 1 |
| 16 | 60 | 1 | 20 | 3 | 4 | 5 | 4 | 1 |
| 17 | 64 | 1 | 32 | 2 | 16 | 2 | 4 | 4 |
| 18 | 72 | 1 | 24 | 3 | 12 | 2 | 4 | 3 |

TABLE 11-continued

| Csrs | BSRS = 0 | | BSRS = 1 | | BSRS = 2 | | BSRS = 3 | |
|---|---|---|---|---|---|---|---|---|
| | mSRS, 0 | N0 | mSRS, 1 | N1 | mSRS, 2 | N2 | mSRS, 3 | N3 |
| 19 | 72 | 1 | 36 | 2 | 12 | 3 | 4 | 3 |
| 20 | 76 | 1 | 4 | 19 | 4 | 1 | 4 | 1 |
| 21 | 80 | 1 | 40 | 2 | 20 | 2 | 4 | 5 |
| 22 | 88 | 1 | 44 | 2 | 4 | 11 | 4 | 1 |
| 23 | 96 | 1 | 32 | 3 | 16 | 2 | 4 | 4 |
| 24 | 96 | 1 | 48 | 2 | 24 | 2 | 4 | 6 |
| 25 | 104 | 1 | 52 | 2 | 4 | 13 | 4 | 1 |
| 26 | 112 | 1 | 56 | 2 | 28 | 2 | 4 | 7 |
| 27 | 120 | 1 | 60 | 2 | 20 | 3 | 4 | 5 |
| 28 | 120 | 1 | 40 | 3 | 8 | 5 | 4 | 2 |
| 29 | 120 | 1 | 24 | 5 | 12 | 2 | 4 | 3 |
| 30 | 128 | 1 | 64 | 2 | 32 | 2 | 4 | 8 |
| 31 | 128 | 1 | 64 | 2 | 16 | 4 | 4 | 4 |
| 32 | 128 | 1 | 16 | 8 | 8 | 2 | 4 | 2 |
| 33 | 132 | 1 | 44 | 3 | 4 | 11 | 4 | 1 |
| 34 | 136 | 1 | 68 | 2 | 4 | 17 | 4 | 1 |
| 35 | 144 | 1 | 72 | 2 | 36 | 2 | 4 | 9 |
| 36 | 144 | 1 | 48 | 3 | 24 | 2 | 12 | 2 |
| 37 | 144 | 1 | 48 | 3 | 16 | 3 | 4 | 4 |
| 38 | 144 | 1 | 16 | 9 | 8 | 2 | 4 | 2 |
| 39 | 152 | 1 | 76 | 2 | 4 | 19 | 4 | 1 |
| 40 | 160 | 1 | 80 | 2 | 40 | 2 | 4 | 10 |
| 41 | 160 | 1 | 80 | 2 | 20 | 4 | 4 | 5 |
| 42 | 160 | 1 | 32 | 5 | 16 | 2 | 4 | 4 |
| 43 | 168 | 1 | 84 | 2 | 28 | 3 | 4 | 7 |
| 44 | 176 | 1 | 88 | 2 | 44 | 2 | 4 | 11 |
| 45 | 184 | 1 | 92 | 2 | 4 | 23 | 4 | 1 |
| 46 | 192 | 1 | 96 | 2 | 48 | 2 | 4 | 12 |
| 47 | 192 | 1 | 96 | 2 | 24 | 4 | 4 | 6 |
| 48 | 192 | 1 | 64 | 3 | 16 | 4 | 4 | 4 |
| 49 | 192 | 1 | 24 | 8 | 8 | 3 | 4 | 2 |
| 50 | 208 | 1 | 104 | 2 | 52 | 2 | 4 | 13 |

TABLE 11-continued

| Csrs | BSRS = 0 | | BSRS = 1 | | BSRS = 2 | | BSRS = 3 | |
|---|---|---|---|---|---|---|---|---|
| | mSRS, 0 | N0 | mSRS, 1 | N1 | mSRS, 2 | N2 | mSRS, 3 | N3 |
| 51 | 216 | 1 | 108 | 2 | 36 | 3 | 4 | 9 |
| 52 | 224 | 1 | 112 | 2 | 56 | 2 | 4 | 14 |
| 53 | 240 | 1 | 120 | 2 | 60 | 2 | 4 | 15 |
| 54 | 240 | 1 | 80 | 3 | 20 | 4 | 4 | 5 |
| 55 | 240 | 1 | 48 | 5 | 16 | 3 | 8 | 2 |
| 56 | 240 | 1 | 24 | 10 | 12 | 2 | 4 | 3 |
| 57 | 256 | 1 | 128 | 2 | 64 | 2 | 4 | 16 |
| 58 | 256 | 1 | 128 | 2 | 32 | 4 | 4 | 8 |
| 59 | 256 | 1 | 16 | 16 | 8 | 2 | 4 | 2 |
| 60 | 264 | 1 | 132 | 2 | 44 | 3 | 4 | 11 |
| 61 | 272 | 1 | 136 | 2 | 68 | 2 | 4 | 17 |
| 62 | 272 | 1 | 68 | 4 | 4 | 17 | 4 | 1 |
| 63 | 272 | 1 | 16 | 17 | 8 | 2 | 4 | 2 |

As described above, in the case of Rel-15 SRS, a position and a bandwidth in a frequency domain are determined by 'freqDomainPosition', 'freqDomainShift', 'c-SRS', 'b-SRS', and 'b-hop', which are RRC parameters configured for each SRS resource. In addition, frequency hopping is enabled when b-hop is less than b-SRS, and frequency hopping is disabled when b-hop is greater than or equal to b-SRS.

Based on this background, when a base station configures/activates/indicates a terminal to transmit an SRS, a dynamic SRS resource allocation method is proposed below.

In the present disclosure, '/' may be interpreted as 'and', 'or', or 'and/or' depending on the context.

Embodiment 1: When a base station performs PUSCH scheduling to a terminal through a UL grant DCI (e.g., DCI format 0_1, 0_2) and also triggers transmission of an aperiodic SRS (e.g., through an SRS request field) through), frequency domain resource allocation (FDRA) of an aperiodic SRS may be performed as follows.

A base station may perform an FDRA indication for aperiodic SRS transmission based on/using FDRA information of a PUSCH. PUSCH scheduling is performed after a base station performs UL link adaptation based on an SRS for a codebook (CB) or a non-codebook (NCB) transmitted from a terminal. A base station may allocate/assign a frequency domain resource for the PUSCH by utilizing an SRS subband having a good channel state in a UL frequency domain. Therefore, a base station can dynamically utilize FDRA information on a PUSCH having a good channel state again for an SRS (e.g., for UL link adaptation).

Here, FDRA of an aperiodc SRS based on/using the FDRA information of the PUSCH is performed based on on/off configurations through an RRC level/layer activation indicator (enabler) of a base station or/and may be performed based on a separate field within the PUSCH scheduling DCI. That the RRC activation indicator (enabler) is 'on' may mean that the RRC activation indicator (enabler) is configured or that a value indicating an activation is indicated by the activation indicator (enabler), and that the RRC activation indicator is 'off' may mean that the RRC activation indicator is not configured or that a value indicating a deactivation is indicated by the activation indicator. Similarly, if a separate field is configured in PUSCH scheduling DCI or a value indicating and activation is indicated by the separate field, the FDRA information of the PUSCH may be utilized. Conversely, if a separate field is not configured in PUSCH scheduling DCI or a value indicating an activation is indicated by the separate field, the FDRA information of the PUSCH may not be utilized.

The meaning of based on/using the FDRA information of the PUSCH may be defined as options 1/2/3 according to a PUSCH FDRA scheme as follows. Below, an SRS bandwidth indication according to Embodiment 1 and/or Embodiment 2 indicates that a sounding bandwidth is dynamically changed. Here, an SRS bandwidth indication may indicate dynamically changing a sounding bandwidth according to the options below, while a reference position in a frequency domain by the RRC parameters 'freqDomainPosition' and 'freqDomainShift' and the minimum SRS bandwidth in units of 4 RBs are maintained as the existing configurations. In addition, a terminal may follow the existing RRC configuration as it is for a symbol level resource of an SRS (resource) or may also follow the proposals of the present disclosure.

Option 1) when a FDRA Type for a PUSCH of the UL Grant DCI is Uplink Resource Allocation Type 0

In the case of type 0 FDRA, the FDRA is indicated by a base station in a form of a bitmap in a resource block group (RBG) unit within a BWP.

In this case, in 1-i) an SRS frequency domain resource, a terminal may transmit an SRS (i.e., SRS resource set) triggered by an SRS request field for contiguous bandwidth including both the lowest and highest RBGs indicated for a PUSCH.

For example, when a size of a BWP is 30 RBs and configuration 1 (i.e., by the higher layer parameter rbg-Size) is configured to a terminal (see Table 12), it is assumed that RBG 0, RBG 1, RBG 2, RBG 6, RBG 8, and RBG 9 in units of 2 RBs are indicated for a PUSCH by a FDRA field of UL grant DCI. In this case, when a terminal transmits an SRS (i.e., SRS resource set) triggered by an SRS request field, sounding may be performed on a contiguous bandwidth including all from RBG 0 (i.e., the lowest RBG) to RBG 9 (the highest RBG). That is, since a contiguous bandwidth including all of RBG 0 to RBG 9 is configured/allocated as a bandwidth of SRS resources in an SRS resource set triggered by DCI, a terminal may transmit an SRS to a base station on SRS resources within an SRS resource set triggered in a corresponding bandwidth.

By performing sounding on continuous bandwidth including corresponding RBGs based on that RBGs having good channel quality have been used for a PUSCH in SRS UL link adaptation before, it is possible to reuse frequency domain resources having good channel quality.

TABLE 12

| BWP size | configuration 1 | configuration 2 |
|---|---|---|
| 1-36 | 2 | 4 |
| 37-72 | 4 | 8 |
| 73-144 | 8 | 16 |
| 145-275 | 16 | 16 |

Alternatively, 1-ii) in an SRS frequency domain resource, a terminal may transmit an SRS (i.e., SRS resource set) triggered by an SRS request field in contiguous bandwidth including all RBG(s) (i.e., RBGs not indicated by PUSCH FDRA in (active) BWP) excluding RBGs indicated for a PUSCH.

For example, when a size of a BWP is 30 RBs and configuration 1 (i.e., by the higher layer parameter rbg-Size) is configured to a terminal (see Table 12), it is assumed that RBG 0, RBG 1, RBG 2, RBG 6, RBG 8, and RBG 9 in units of 2 RBs are indicated for a PUSCH by a FDRA field of UL grant DCI. In this case, when a terminal transmits an SRS (i.e., SRS resource set) triggered by an SRS request field, sounding for contiguous bandwidth including all RBGs (RBGs 3, 4, 5, 7, 10, 11, 12, 13, 14) excluding RBGs indicated by PUSCH FDRA may be performed. That is, since a contiguous bandwidth including all of RBG 3 to RBG 14 is configured/allocated as a bandwidth of SRS resources in an SRS resource set triggered by DCI, a terminal may transmit an SRS to a base station on SRS resources within an SRS resource set triggered in the corresponding bandwidth.

Since PUSCH transmission is performed in the case of an RBG to be used for PUSCH transmission by corresponding UL grant DCI, a base station may measure channel state in a corresponding RBG (via PUSCH DMRS, etc.) after receiving the PUSCH. Therefore, by performing sounding on a contiguous bandwidth including remaining RBGs excluding an RBG for a corresponding PUSCH within a BWP, an additional high-quality (uplink) channel in addition to an RBG for a PUSCH may be searched.

As another example, in 1-iii) an SRS frequency domain resource, a terminal may transmit an SRS (i.e., SRS resource set) triggered by an SRS request field for a contiguous bandwidth including all consecutive RBG combinations having the largest bandwidth among consecutive RBG combinations in RBG(s) (i.e., RBG not indicated in PUSCH FDRA within an (active) BWP) excluding an RBG indicated for a PUSCH. That is, in the example of 1-ii) above, among RBGs (RBGs 3, 4, 5, 7, 10, 11, 12, 13, and 14) excluding an RBG indicated by PUSCH FDRA, continuous RBG combinations correspond to RBGs 10, 11, 12, 13, and 14. In this case, a terminal may perform sounding on a contiguous bandwidth including all of RBGs 10, 11, 12, 13, and 14. That is, since a contiguous bandwidth including all of RBG 10 to RBG 14 is configured/allocated as a bandwidth of SRS resources in an SRS resource set triggered by DCI, a terminal may transmit an SRS to a base station on SRS resources within an SRS resource set triggered in the corresponding bandwidth.

This is to prevent that an SRS bandwidth according to method 1-ii) may become very inefficient because other RBG(s) other than RBG(s) indicated by PUSCH FDRA may be discontinuous.

As another example, 1-iv) in order to indicate a fully flexible SRS bandwidth, a base station may indicate an SRS bandwidth (through a separate SRS FDRA field) using the type 0 FDRA bitmap method as it is. That is, as the type 0 uplink resource allocation method, a bitmap indicating RBGs for an SRS resource set triggered by DCI may be indicated through a separate SRS FDRA field. In this case, the type 0 uplink resource allocation method may be equivalently applied.

There is an advantage of enabling flexible and dynamic channel measurement by indicating (continuous) RBGs to be measured by a base station as an SRS bandwidth.

Option 2) when a FDRA Type for a PUSCH of the UL Grant DCI is Uplink Resource Allocation Type 1

When a base station indicates type 1 FDRA which is performed based on a resource indication value (RIV) jointly indicating a starting RB and a length of consecutive RBs, 2-i) in an SRS frequency domain resource, a terminal may transmit an SRS (i.e., SRS resource set) triggered by an SRS request field for contiguous bandwidth including all contiguous RBs indicated for a PUSCH.

By performing sounding on continuous bandwidth including corresponding RBs based on that RBs having good channel quality have been used for a PUSCH in SRS UL link adaptation before, it is possible to reuse frequency domain resources having good channel quality.

Alternatively, 2-ii) in an SRS frequency domain resource, a terminal may transmit an SRS (i.e., SRS resource set) triggered by an SRS request field in contiguous bandwidth including all RBs (i.e., RB(s) not indicated by PUSCH FDRA in (active) BWP) excluding contiguous RBs indicated for a PUSCH.

Since PUSCH transmission is performed in the case of an RB to be used for PUSCH transmission by the corresponding UL grant DCI, a base station can measure channel state of the corresponding RB (via PUSCH DMRS, etc.) after receiving the PUSCH. Therefore, by performing sounding on a contiguous bandwidth including remaining RBs excluding an RB for a corresponding PUSCH within a BWP, an additional high-quality (uplink) channel in addition to an RB for a PUSCH may be searched.

As another example, 2-iii) in RBs other than consecutive RBs indicated for a PUSCH, there may be a plurality of consecutive RB combinations (e.g., up to two consecutive RB combinations other than RB(s) for PUSCH allocation). A terminal may transmit an SRS (i.e., SRS resource set) triggered by an SRS request field for a contiguous bandwidth to include all contiguous RB combinations having the largest bandwidth among a plurality of contiguous RB combinations.

In a BWP, when a region indicated for a PUSCH is an intermediate point in the BWP, when method 2-ii is used, an SRS is transmitted to all bands of the BWP. That is, since SRS transmission is performed in a contiguous bandwidth including all RBs not allocated for a PUSCH, an SRS is transmitted in all bands of a BWP. By preventing this and transmitting an SRS by a terminal concentrating transmission power on RBs having a wide bandwidth among contiguous RBs (i.e., contiguous RBs not allocated for a PUSCH), in addition to the RB for PUSCH, an effect of searching for an additional high-quality (uplink) channel can be maximized.

Option 3) when a FDRA Type for a PUSCH of the UL Grant DCI is Uplink Resource Allocation Type 2

When type 2 FDRA in which up to N sets of RB sets and up to M sets of interlace indexes are indicated (in particular, for unlicensed band (NR-U) use) is indicated by a base station, 3-i) a terminal may override/ignore an existing SRS bandwidth-related configuration and may transmit an SRS (i.e., SRS resource set) triggered by an SRS request field for a continuous bandwidth including all RB set(s) for a PUSCH (indicated by performing LBT (Listen Before Talk)). For example, as described above, if n (n=1, . . . , N−1) RB sets in units of 20 MHz are indicated (sequentially) and one or more interlace indexes are indicated, an intersection of n sets of RB sets and interlaced RBs according to one or more interlace indexes is allocated to a terminal as a PUSCH resource. In this case, since a continuous bandwidth including all n sets of RB sets is configured/allocated as a bandwidth of SRS resources in an SRS resource set triggered by DCI, a terminal may transmit an SRS to a base station on SRS resources within an SRS resource set triggered in the corresponding bandwidth.

This is an operation in which a terminal transmits an SRS only for a corresponding RB set(s) by considering that RB set(s) indicated for a PUSCH by performing LBT will be idle. This embodiment has an effect of preventing collision with other terminals when transmitting an SRS in another RB set(s) (which has not performed LBT in advance) in an unlicensed band.

Alternatively, 3-ii) in preparation for a case that RB set(s) for a PUSCH indicated by UL grant DCI is not contiguous, among RB set(s) scheduled for a PUSCH, which RB set(s)

a terminal will transmit an SRS (i.e., SRS resource set) may be indicated (through a separate field) in the UL grant DCI. In this case, similarly, there is an effect of preventing an SRS of the terminal from colliding with a UL channel of another terminal in other RB set(s) (not performing LBT).

As another example, 3-iii) the following may be applied only when transmission is indicated by DCI without a timing gap between a PUSCH scheduled by the type 2 FDRA and an SRS (i.e., when a PUSCH and an SRS are scheduled in the same slot or adjacent slots). Here, a PUSCH may be transmitted before an SRS, and an SRS may be transmitted before a PUSCH in a time domain. For example, a slot offset between DCI triggering a corresponding SRS resource set and transmission of an actual SRS resource set may be configured by higher layer signaling (e.g., higher layer parameter 'slotOffset'). In addition, as described above for each SRS resource, a position and a bandwidth in a frequency domain are determined by higher layer signaling (i.e., higher layer parameters 'freqDomainPosition', 'freqDomainShift', 'c-SRS', 'b-SRS', 'b-hop').

In this case, when an SRS RB set is larger than a PUSCH RB set (i.e., when a bandwidth of an SRS exceeds 1 RB set or when an SRS bandwidth exceeds 20 MHz), a terminal may override/ignore a bandwidth-related configuration of an SRS, and may transmits an SRS only for an RB set corresponding to a PUSCH RB set among preceding or/and succeeding SRS RB sets, and may puncture/drop an SRS of an RB set(s) that does not correspond to a PUSCH RB set. For example, within an SRS resource set triggered by DCI, different frequency bandwidths may be configured for each SRS resource, and in this case, puncturing/drop locations may be different for each SRS resource.

Since an LBT procedure of a terminal is performed in units of up to 20 MHz, when a PUSCH is transmitted after an LBT, it may not be guaranteed whether a corresponding frequency channel is idle for an SRS bandwidth larger than a PUSCH RB set (i.e., exceeding 20 MHz). Therefore, through the above operation, there is an effect of preventing collision with UL channels of other terminals by puncturing/dropping SRS transmissions in other RB set(s) (which have not performed LBT in advance). In particular, when a timing gap between a PUSCH and an SRS is above a certain level, a terminal can transmit both a PUSCH and an SRS through multiple LBT operations, but this is to reduce possibility of collision in the case of continuous transmission without a timing gap.

The Method 3-iii may follow the terminal operation as follows.

A terminal may perform an LBT only on an RB set corresponding to a PUSCH bandwidth.

a. If the LBT is successful, a terminal may operate to transmit only a PUSCH and an SRS indicated in an RB set (within the corresponding RB set) corresponding to the PUSCH bandwidth as in the Method 3-iii.

b. If the LBT fails, a terminal may operate to perform an LBT on all RB sets corresponding to an entire SRS bandwidth.

b-1: After operation b, a terminal may operate to transmit the SRS only when an LBT succeeds for all of the RB sets (i.e., RB sets corresponding to an entire SRS bandwidth).

b-2: After operation b, unlike b-1, a terminal may operate to transmit only an SRS indicated (in a corresponding RB set) in an RB set in which an LBT was successful among the RB sets (i.e., RB sets corresponding to an entire SRS bandwidth) (an SRS in the remaining RB set is punctured/dropped).

That is, option 3 proposes an operation in which a bandwidth of an aperiodic SRS is indicated by an RB set(s) indicated for a PUSCH.

As another embodiment of the above-described embodiment 1 (hereinafter referred to as embodiment 2), the operation of performing the SRS FDRA indication based on/using the PUSCH FDRA of a base station may be operated as follows when 'on' by RRC and/or DCI. In this case, regardless of a PUSCH FDRA type (i.e., type 0/1/2), a terminal may transmit an SRS (i.e., SRS resource set) triggered by an SRS request field by utilizing the same frequency domain resource as PUSCH FDRA in 1:1 mapping (i.e. overriding/ignoring existing SRS bandwidth configuration).

In the above embodiment, for alignment with an SRS frequency boundary by RRC configuration (i.e., higher layer parameters 'freqDomainPosition', 'freqDomainShift') for a frequency boundary and an SRS bandwidth, which are references in FDRA of a PUSCH, and an SRS minimum bandwidth in units of 4 RBs, a terminal may not expect that a frequency boundary between a PUSCH and an SRS is different. In addition, when the PUSCH FDRA is type 0, a terminal may not expect that an RBG for a PUSCH is configured with a granularity of 4 RBs or less. Alternatively, in the above embodiment, even if a frequency boundary of a PUSCH bandwidth and an SRS bandwidth do not match, a terminal may transmit an SRS by using a frequency domain resource indicated by the PUSCH FDRA as it is. This operation has an advantage that a good quality channel can be reused by indicating a terminal to transmit an SRS by reusing a corresponding frequency domain resource as it is even if the PUSCH FDRA is not continuous.

In the above-described embodiment 1 (option 1/2/3) and the above embodiment 2, a terminal may override/ignore a value previously configured by RRC signaling (i.e., higher layer parameter 'slotOffset') for an SRS (i.e., SRS resource set) triggered by an SRS request field of the UL grant DCI and may transmit a corresponding SRS (i.e., SRS resource set) in a PUSCH transmission slot indicated by PUSCH time domain resource allocation (TDRA) information of the DCI.

This has an effect of improving SRS channel estimation performance and saving UL resources by simultaneously transmitting a PUSCH and an SRS in limited UL slot resources. In addition, the operation for the slot offset of the SRS may be applied only when a symbol level position of the PUSCH and a symbol level position of the triggered SRS (SRS resource(s) in the SRS resource set) do not overlap. If a symbol level position of a PUSCH and a symbol level position of a triggered SRS (i.e., the SRS resource(s) in the triggered SRS resource set) overlap, A) a terminal may transmit an SRS in the next valid UL slot (i.e., a slot in which SRS transmission is possible) by delaying/shifting the corresponding SRS (SRS resource(s)), or B) may transmit an SRS in a UL slot according to a pre-configured RRC slot offset (slotOffset). For example, since a symbol start position (e.g., higher layer parameter 'startPosition') and the number of symbols (higher layer parameter 'nrofSymbols') may be configured for each SRS resource in an SRS resource set triggered by DCI, above embodiment may be independently applied for each SRS resource.

The SRS (i.e., SRS resource set) utilized in Embodiment 1 and/or Embodiment 2 may be applied only to an SRS resource set for 'codebook (CB)' and 'non-codebook (non-CB)' purposes.

In addition, in the 'time domain bundling configuration/indication of an SRS and a DMRS' of the above proposal A (proposal A-1/proposal A-2/i/ii/i-1/ii-1/ii-2/ii-3) to proposal B, the above-described Embodiment 1 and/or Embodiment 2 may be applied when bundling of a PUSCH DMRS and an SRS is configured. Alternatively, a restriction that an operation between a base station and a terminal of the Embodiment 1 and/or Embodiment 2 must be preceded before 'time domain bundling configuration/indication of an SRS and a DMRS' of the above proposal A (proposal A-1/proposal A-2/i/ii/i-1/ii-1/ii-2/ii-3) to proposal B is possible may be configured/defined.

Figure 11:
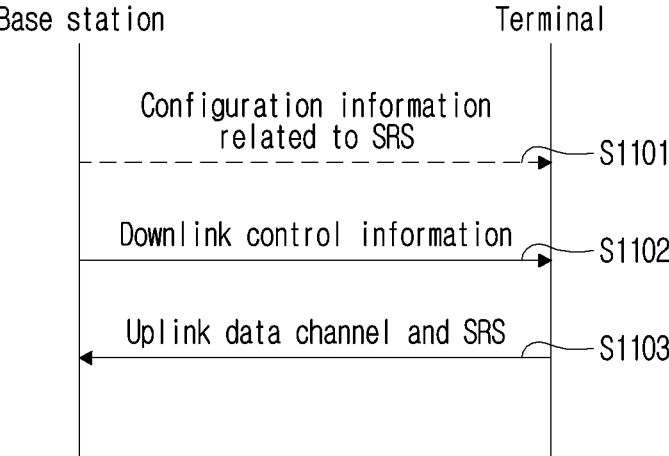
FIG. 11 is a diagram illustrating a signaling procedure between a base station and a terminal for a method for transmitting and receiving a sounding reference signal according to an embodiment of the present disclosure.

FIG. 11 is a diagram illustrating a signaling procedure between a base station and a terminal for a method for transmitting and receiving a sounding reference signal according to an embodiment of the present disclosure.

FIG. 11 illustrates a signaling procedure between a terminal and a base station based on the previously proposed Embodiment 1 (options 1/2/3) and Embodiment 2. The example of FIG. 11 is for convenience of description and does not limit the scope of the present disclosure. Some step(s) illustrated in FIG. 11 may be omitted depending on circumstances and/or configurations. In addition, the base station and the terminal in FIG. 11 are just one example, and may be implemented as a device illustrated in FIG. 14 below. For example, the processor (102/202) of FIG. 14 may control to transmit and receive channels/signals/data/information, etc. (e.g., SRS-related configuration information, DCI for UL/DL scheduling, additional SRS, PDCCH, PDSCH, PUSCH, PUCCH, etc.) using the transceiver (106/206), and may also control to store transmitted or received channels/signals/data/information, etc. in the memory (104/204).

Referring to FIG. 11, a base station (BS) may transmit configuration information related to an SRS to a terminal (UE, user equipment) (S1101). That is, a UE may receive configuration information related to an SRS from a base station.

Here, the configuration information related to an SRS may include configuration information related to SRS transmission, configuration information for one or more SRS resource sets (i.e., N (N is a natural number) SRS resource sets), etc. and each SRS resource set may include one or more SRS resources, and thus configuration information may include configuration information for one or more SRS resources.

In addition, the configuration information related to an SRS may include a usage value for each SRS resource set (or each SRS resource). Here, the usage may include a codebook (codebook), non-codebook (nonCodebook), beam management (beamManagement), antenna switching (antennaSwitching), and/or positioning (positioning), etc.

In addition, the configuration information related to an SRS may include time domain operation (i.e., periodic transmission, aperiodic transmission, semi-persistent transmission) information for each SRS resource set (or each SRS resource).

In addition, the configuration information related to an SRS may include information for determining a position and a bandwidth in a frequency domain for each SRS resource (e.g., parameters such as 'freqDomainPosition', 'freqDomainShift', 'c-SRS', 'b-SRS', and 'b-hop').

In addition, the configuration information related to an SRS may include information for determining a symbol level resource for SRS transmission for each SRS resource (e.g., parameters such as 'startPosition' and 'nrofSymbols', etc.). In addition, in the case of aperiodic SRS, slot offset information (e.g., parameters such as 'slotOffset', etc.) between triggering DCI and SRS transmission may be included.

In addition, the configuration information related to an SRS may include information for configuring as activated/enabled of operations of the above-described Embodiment 1 (option 1/2/3) and the above-described Embodiment 2. In other words, the configuration information related to an SRS may include information for configuring whether a transmission bandwidth of the SRS is determined based on frequency resource allocation information for PUSCH transmission.

Also, although not shown in FIG. 11, a BS may transmit configuration information for an uplink channel (e.g., PUSCH) to a UE. That is, a UE may receive configuration information for an uplink channel (e.g., PUSCH) from a base station. The configuration information for the uplink channel includes information for configuring an uplink frequency resource allocation type (e.g., higher layer parameters such as 'resourceAllocation', 'resourceAllocationDCI-0-2', or 'useInterlacePUCCH-PUSCH', etc.).

A base station (BS) transmits, to a terminal (UE), DCI that triggers transmission of an SRS on one or more SRS resources in an SRS resource set (i.e., a specific SRS resource among one or more SRS resource sets) configured for the terminal and also schedules an uplink data channel (e.g., PUSCH) (S1102).

DCI includes frequency domain resource allocation (FDRA) information for a PUSCH. Here, as described above, frequency domain resource allocation information may have different types of information indicated according to uplink frequency resource allocation types. For example, in the case of uplink frequency resource allocation type 0, frequency domain resource allocation (FDRA) information may correspond to a bitmap indicating RBGs allocated for PUSCH transmission. In addition, in the case of uplink frequency resource allocation type 1, frequency domain resource allocation (FDRA) information may correspond to a resource indication value (RIV) indicating jointly a starting RB and a length of consecutive RBs allocated for PUSCH transmission. In addition, in the case of uplink frequency resource allocation type 2, frequency domain resource allocation (FDRA) information may correspond to one or more RB sets and an interlace index.

In addition, DCI may include information for indicating an uplink frequency resource allocation type.

In addition, DCI may include information for configuring as activated/enabled for operations of the above-described Embodiment 1 (options 1/2/3) and the above-described Embodiment 2. In other words, DCI may include information for configuring whether a transmission bandwidth of an SRS is determined based on frequency resource allocation information for PUSCH transmission.

A terminal (UE) transmits an uplink data channel (e.g., PUSCH) and an SRS to a base station (BS) (S1103).

A transmission bandwidth of an SRS may be determined based on frequency resource allocation information for transmission of the PUSCH. That is, a transmission bandwidth of all or one or more SRS resources included in an SRS resource set triggered by DCI may be determined based on frequency resource allocation information for transmission of the PUSCH.

For example, when a frequency resource allocation type for the PUSCH is uplink resource allocation type 0, a transmission bandwidth of the SRS may be determined as a contiguous bandwidth including both the lowest RBG and the highest RBG for transmission of the PUSCH transmission. Alternatively, a transmission bandwidth of the SRS may be determined as a contiguous bandwidth including all RBGs except for one or more RBGs allocated for transmission of the PUSCH. Alternatively, the transmission bandwidth of the SRS may be determined as a contiguous bandwidth including all contiguous RBGs having the largest bandwidth among RBGs excluding one or more RBGs allocated for transmission of the PUSCH.

In addition, when a frequency resource allocation type for the PUSCH is uplink resource allocation type 1, a transmission bandwidth of the SRS may be determined as a contiguous bandwidth including all one or more contiguous RBs for transmission of the PUSCH. Alternatively, a transmission bandwidth of the SRS may be determined as a contiguous bandwidth including all RBs except for one or more RBs allocated for transmission of the PUSCH. Alternatively, a transmission bandwidth of the SRS may be determined as a contiguous bandwidth including all contiguous RBs having the largest bandwidth among RBs excluding one or more RBs allocated for transmission of the PUSCH.

In addition, when a frequency resource allocation type for the PUSCH is uplink resource allocation type 2, a transmission bandwidth of the SRS may be determined as a contiguous bandwidth including all of one or more RB sets allocated for transmission of the PUSCH. Alternatively, a transmission bandwidth of the SRS may be determined by one or more RB sets indicated by the DCI among one or more RB sets allocated for transmission of the PUSCH. Alternatively, a transmission bandwidth of the SRS may be determined as one or more RB sets for transmission of the PUSCH. Here, when the PUSCH and the SRS are transmitted in the same slot or an adjacent slot, and/or the configured bandwidth for the SRS is greater than one or more resource block sets for transmission of the PUSCH, a transmission bandwidth of the SRS may be determined as one or more RB sets for transmission of the PUSCH. In this case, as described above, a listen before talk (LBT) operation may be performed in a bandwidth corresponding to one or more RB sets for transmission of the PUSCH, and if the LBT operation fails, the LBT operation may be re-performed in a bandwidth configured for the SRS.

In addition, regardless of the frequency resource allocation type for the PUSCH, a transmission bandwidth of the SRS may be determined as a frequency resource allocated by frequency resource allocation information for transmission of the PUSCH.

In addition, the SRS may be transmitted in a slot allocated by time resource allocation information for transmission of the PUSCH. That is, a transmission slot of the SRS may be determined by time resource allocation information for transmission of the PUSCH.

FIG. 12 is a diagram illustrating an operation of a terminal for transmitting and receiving a sounding reference signal according to an embodiment of the present disclosure.

FIG. 12 illustrates an operation of a terminal based on the previously proposed Embodiment 1 (options 1/2/3) and Embodiment 2. The example of FIG. 12 is for convenience of description and does not limit the scope of the present disclosure. Some step(s) illustrated in FIG. 12 may be omitted depending on circumstances and/or configurations. In addition, the terminal in FIG. 12 is just one example, and may be implemented as a device illustrated in FIG. 14 below. For example, the processor (102/202) of FIG. 14 may control to transmit and receive channels/signals/data/information, etc. using the transceiver (106/206), and may also control to store transmitted or received channels/signals/ data/information, etc. in the memory (104/204).

Figure 14:
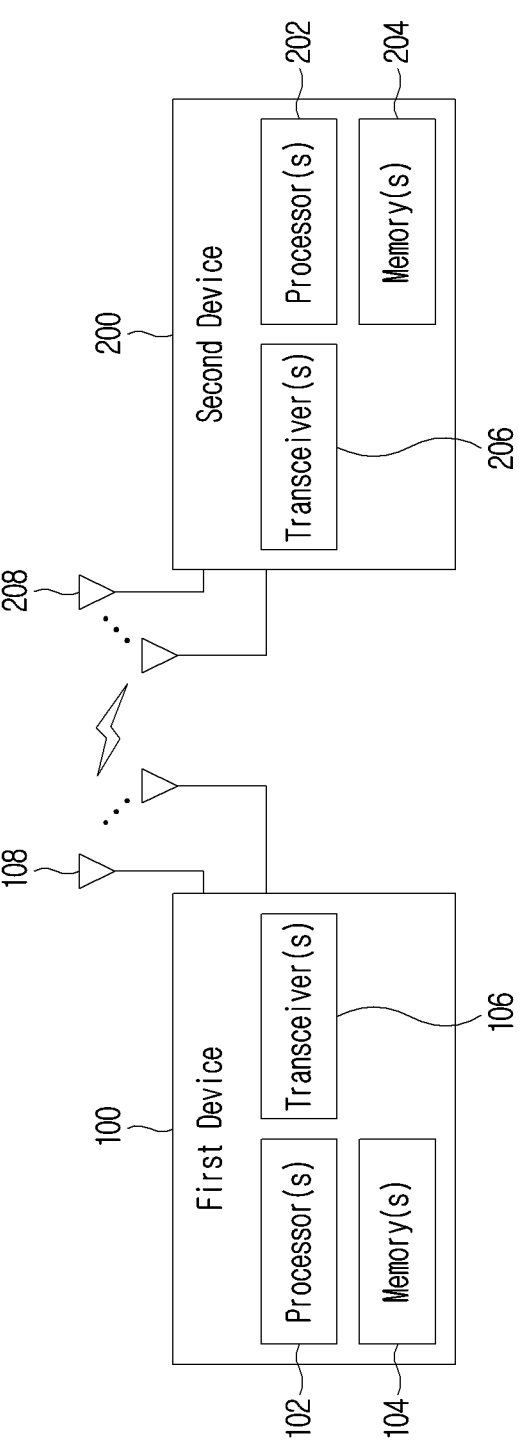
FIG. 14 illustrates a block diagram of a wireless communication device according to an embodiment of the present disclosure.

Additionally, the operation of FIG. 12 may be processed by one or more processors (102, 202) of FIG. 14. In addition, the operation of FIG. 12 may be stored in a memory (e.g., one or more memories (104, 204) of FIG. 14) in a form of instructions/programs (e.g., instructions, executable codes) for driving at least one processor (e.g., 102, 202) of FIG. 14.

Referring to FIG. 12, a terminal may receive configuration information related to an SRS from a base station (S1201).

Here, the configuration information related to an SRS may include configuration information related to SRS transmission, configuration information for one or more SRS resource sets (i.e., N (N is a natural number) SRS resource sets), etc. and each SRS resource set may include one or more SRS resources, and thus configuration information may include configuration information for one or more SRS resources.

In addition, the configuration information related to an SRS may include a usage value for each SRS resource set (or each SRS resource). Here, the usage may include a codebook (codebook), non-codebook (nonCodebook), beam management (beamManagement), antenna switching (antennaSwitching), and/or positioning (positioning), etc.

In addition, the configuration information related to an SRS may include time domain operation (i.e., periodic transmission, aperiodic transmission, semi-persistent transmission) information for each SRS resource set (or each SRS resource).

In addition, the configuration information related to an SRS may include information for determining a position and a bandwidth in a frequency domain for each SRS resource (e.g., parameters such as 'freqDomainPosition', 'freqDomainShift', 'c-SRS', 'b-SRS', and 'b-hop').

In addition, the configuration information related to an SRS may include information for determining a symbol level resource for SRS transmission for each SRS resource (e.g., parameters such as 'startPosition' and 'nrofSymbols', etc.). In addition, in the case of aperiodic SRS, slot offset information (e.g., parameters such as 'slotOffset', etc.) between triggering DCI and SRS transmission may be included.

In addition, the configuration information related to an SRS may include information for configuring as activated/ enabled of operations of the above-described Embodiment 1 (option 1/2/3) and the above-described Embodiment 2. In other words, the configuration information related to an SRS may include information for configuring whether a transmission bandwidth of the SRS is determined based on frequency resource allocation information for PUSCH transmission.

Also, although not shown in FIG. 12, a terminal may receive configuration information for an uplink channel (e.g., PUSCH) from a base station. The configuration information for the uplink channel includes information for configuring an uplink frequency resource allocation type (e.g., higher layer parameters such as 'resourceAllocation', 'resourceAllocationDCI-0-2', or 'useInterlacePUCCH-PUSCH', etc.).

A terminal receives, from a base station, DCI that triggers transmission of an SRS on one or more SRS resources in an SRS resource set (i.e., a specific SRS resource among one or more SRS resource sets) configured for the terminal and also schedules an uplink data channel (e.g., PUSCH) (S1202).

DCI includes frequency domain resource allocation (FDRA) information for a PUSCH. Here, as described above, frequency domain resource allocation information may have different types of information indicated according to uplink frequency resource allocation types. For example, in the case of uplink frequency resource allocation type 0, frequency domain resource allocation (FDRA) information may correspond to a bitmap indicating RBGs allocated for PUSCH transmission. In addition, in the case of uplink frequency resource allocation type 1, frequency domain resource allocation (FDRA) information may correspond to a resource indication value (RIV) indicating jointly a starting RB and a length of consecutive RBs allocated for PUSCH transmission. In addition, in the case of uplink frequency resource allocation type 2, frequency domain resource allocation (FDRA) information may correspond to one or more RB sets and an interlace index.

In addition, DCI may include information for indicating an uplink frequency resource allocation type.

In addition, DCI may include information for configuring as activated/enabled for operations of the above-described Embodiment 1 (options 1/2/3) and the above-described Embodiment 2. In other words, DCI may include information for configuring whether a transmission bandwidth of an SRS is determined based on frequency resource allocation information for PUSCH transmission.

A terminal transmits an uplink data channel (e.g., PUSCH) and an SRS to a base station (S1203).

A transmission bandwidth of an SRS may be determined based on frequency resource allocation information for transmission of the PUSCH. That is, a transmission bandwidth of all or one or more SRS resources included in an SRS resource set triggered by DCI may be determined based on frequency resource allocation information for transmission of the PUSCH.

For example, when a frequency resource allocation type for the PUSCH is uplink resource allocation type 0, a transmission bandwidth of the SRS may be determined as a contiguous bandwidth including both the lowest RBG and the highest RBG for transmission of the PUSCH transmission. Alternatively, a transmission bandwidth of the SRS may be determined as a contiguous bandwidth including all RBGs except for one or more RBGs allocated for transmission of the PUSCH. Alternatively, the transmission bandwidth of the SRS may be determined as a contiguous bandwidth including all contiguous RBGs having the largest bandwidth among RBGs excluding one or more RBGs allocated for transmission of the PUSCH.

In addition, when a frequency resource allocation type for the PUSCH is uplink resource allocation type 1, a transmission bandwidth of the SRS may be determined as a contiguous bandwidth including all one or more contiguous RBs for transmission of the PUSCH. Alternatively, a transmission bandwidth of the SRS may be determined as a contiguous bandwidth including all RBs except for one or more RBs allocated for transmission of the PUSCH. Alternatively, a transmission bandwidth of the SRS may be determined as a contiguous bandwidth including all contiguous RBs having the largest bandwidth among RBs excluding one or more RBs allocated for transmission of the PUSCH.

In addition, when a frequency resource allocation type for the PUSCH is uplink resource allocation type 2, a transmission bandwidth of the SRS may be determined as a contiguous bandwidth including all of one or more RB sets allocated for transmission of the PUSCH. Alternatively, a transmission bandwidth of the SRS may be determined by one or more RB sets indicated by the DCI among one or more RB sets allocated for transmission of the PUSCH. Alternatively, a transmission bandwidth of the SRS may be determined as one or more RB sets for transmission of the PUSCH. Here, when the PUSCH and the SRS are transmitted in the same slot or an adjacent slot, and/or the configured bandwidth for the SRS is greater than one or more resource block sets for transmission of the PUSCH, a transmission bandwidth of the SRS may be determined as one or more RB sets for transmission of the PUSCH. In this case, as described above, a listen before talk (LBT) operation may be performed in a bandwidth corresponding to one or more RB sets for transmission of the PUSCH, and if the LBT operation fails, the LBT operation may be re-performed in a bandwidth configured for the SRS.

In addition, regardless of the frequency resource allocation type for the PUSCH, a transmission bandwidth of the SRS may be determined as a frequency resource allocated by frequency resource allocation information for transmission of the PUSCH.

In addition, the SRS may be transmitted in a slot allocated by time resource allocation information for transmission of the PUSCH. That is, a transmission slot of the SRS may be determined by time resource allocation information for transmission of the PUSCH.

FIG. 13 is a diagram illustrating an operation of a base station for transmitting and receiving a sounding reference signal according to an embodiment of the present disclosure.

FIG. 13 illustrates an operation of a base station based on the previously proposed Embodiment 1 (options 1/2/3) and Embodiment 2. The example of FIG. 13 is for convenience of description and does not limit the scope of the present disclosure. Some step(s) illustrated in FIG. 13 may be omitted depending on circumstances and/or configurations. In addition, the base station in FIG. 13 is just one example, and may be implemented as a device illustrated in FIG. 14 below. For example, the processor (102/202) of FIG. 14 may control to transmit and receive channels/signals/data/information, etc. using the transceiver (106/206), and may also control to store transmitted or received channels/signals/data/information, etc. in the memory (104/204).

Additionally, the operation of FIG. 13 may be processed by one or more processors (102, 202) of FIG. 14. In addition, the operation of FIG. 13 may be stored in a memory (e.g., one or more memories (104, 204) of FIG. 14) in a form of instructions/programs (e.g., instructions, executable codes) for driving at least one processor (e.g., 102, 202) of FIG. 14.

Referring to FIG. 13, a base station may transmit configuration information related to an SRS to a terminal (S1301).

Here, the configuration information related to an SRS may include configuration information related to SRS transmission, configuration information for one or more SRS resource sets (i.e., N (N is a natural number) SRS resource sets), etc. and each SRS resource set may include one or more SRS resources, and thus configuration information may include configuration information for one or more SRS resources.

In addition, the configuration information related to an SRS may include a usage value for each SRS resource set (or each SRS resource). Here, the usage may include a codebook (codebook), non-codebook (nonCodebook), beam management (beamManagement), antenna switching (antennaSwitching), and/or positioning (positioning), etc.

In addition, the configuration information related to an SRS may include time domain operation (i.e., periodic transmission, aperiodic transmission, semi-persistent transmission) information for each SRS resource set (or each SRS resource).

In addition, the configuration information related to an SRS may include information for determining a position and a bandwidth in a frequency domain for each SRS resource (e.g., parameters such as 'freqDomainPosition', 'freqDomainShift', 'c-SRS', 'b-SRS', and 'b-hop').

In addition, the configuration information related to an SRS may include information for determining a symbol level resource for SRS transmission for each SRS resource (e.g., parameters such as 'startPosition' and 'nrofSymbols', etc.). In addition, in the case of aperiodic SRS, slot offset information (e.g., parameters such as 'slotOffset', etc.) between triggering DCI and SRS transmission may be included.

In addition, the configuration information related to an SRS may include information for configuring as activated/enabled of operations of the above-described Embodiment 1 (option 1/2/3) and the above-described Embodiment 2. In other words, the configuration information related to an SRS may include information for configuring whether a transmission bandwidth of the SRS is determined based on frequency resource allocation information for PUSCH transmission.

Also, although not shown in FIG. 13, a base station may transmit configuration information for an uplink channel (e.g., PUSCH) to a terminal. The configuration information for the uplink channel includes information for configuring an uplink frequency resource allocation type (e.g., higher layer parameters such as 'resourceAllocation', 'resourceAllocationDCI-0-2', or 'useInterlacePUCCH-PUSCH', etc.).

A base station transmits, to a terminal, DCI that triggers transmission of an SRS on one or more SRS resources in an SRS resource set (i.e., a specific SRS resource among one or more SRS resource sets) configured for the terminal and also schedules an uplink data channel (e.g., PUSCH) (S1302).

DCI includes frequency domain resource allocation (FDRA) information for a PUSCH. Here, as described above, frequency domain resource allocation information may have different types of information indicated according to uplink frequency resource allocation types. For example, in the case of uplink frequency resource allocation type 0, frequency domain resource allocation (FDRA) information may correspond to a bitmap indicating RBGs allocated for PUSCH transmission. In addition, in the case of uplink frequency resource allocation type 1, frequency domain resource allocation (FDRA) information may correspond to a resource indication value (RIV) indicating jointly a starting RB and a length of consecutive RBs allocated for PUSCH transmission. In addition, in the case of uplink frequency resource allocation type 2, frequency domain resource allocation (FDRA) information may correspond to one or more RB sets and an interlace index.

In addition, DCI may include information for indicating an uplink frequency resource allocation type.

In addition, DCI may include information for configuring as activated/enabled for operations of the above-described Embodiment 1 (options 1/2/3) and the above-described Embodiment 2. In other words, DCI may include information for configuring whether a transmission bandwidth of an SRS is determined based on frequency resource allocation information for PUSCH transmission.

A terminal transmits an uplink data channel (e.g., PUSCH) and an SRS to a base station (S1203).

A transmission bandwidth of an SRS may be determined based on frequency resource allocation information for transmission of the PUSCH. That is, a transmission bandwidth of all or one or more SRS resources included in an SRS resource set triggered by DCI may be determined based on frequency resource allocation information for transmission of the PUSCH.

For example, when a frequency resource allocation type for the PUSCH is uplink resource allocation type 0, a transmission bandwidth of the SRS may be determined as a contiguous bandwidth including both the lowest RBG and the highest RBG for transmission of the PUSCH transmission. Alternatively, a transmission bandwidth of the SRS may be determined as a contiguous bandwidth including all RBGs except for one or more RBGs allocated for transmission of the PUSCH. Alternatively, the transmission bandwidth of the SRS may be determined as a contiguous bandwidth including all contiguous RBGs having the largest bandwidth among RBGs excluding one or more RBGs allocated for transmission of the PUSCH.

In addition, when a frequency resource allocation type for the PUSCH is uplink resource allocation type 1, a transmission bandwidth of the SRS may be determined as a contiguous bandwidth including all one or more contiguous RBs for transmission of the PUSCH. Alternatively, a transmission bandwidth of the SRS may be determined as a contiguous bandwidth including all RBs except for one or more RBs allocated for transmission of the PUSCH. Alternatively, a transmission bandwidth of the SRS may be determined as a contiguous bandwidth including all contiguous RBs having the largest bandwidth among RBs excluding one or more RBs allocated for transmission of the PUSCH.

In addition, when a frequency resource allocation type for the PUSCH is uplink resource allocation type 2, a transmission bandwidth of the SRS may be determined as a contiguous bandwidth including all of one or more RB sets allocated for transmission of the PUSCH. Alternatively, a transmission bandwidth of the SRS may be determined by one or more RB sets indicated by the DCI among one or more RB sets allocated for transmission of the PUSCH. Alternatively, a transmission bandwidth of the SRS may be determined as one or more RB sets for transmission of the PUSCH. Here, when the PUSCH and the SRS are transmitted in the same slot or an adjacent slot, and/or the configured bandwidth for the SRS is greater than one or more resource block sets for transmission of the PUSCH, a transmission bandwidth of the SRS may be determined as one or more RB sets for transmission of the PUSCH. In this case, as described above, a listen before talk (LBT) operation may be performed in a bandwidth corresponding to one or more RB sets for transmission of the PUSCH, and if the LBT operation fails, the LBT operation may be re-performed in a bandwidth configured for the SRS.

In addition, regardless of the frequency resource allocation type for the PUSCH, a transmission bandwidth of the SRS may be determined as a frequency resource allocated by frequency resource allocation information for transmission of the PUSCH.

In addition, the SRS may be transmitted in a slot allocated by time resource allocation information for transmission of the PUSCH. That is, a transmission slot of the SRS may be determined by time resource allocation information for transmission of the PUSCH.

General Device to which the Present Disclosure May be Applied

FIG. 14 is a diagram which illustrates a block diagram of a wireless communication device according to an embodiment of the present disclosure.

In reference to FIG. 14, a first wireless device 100 and a second wireless device 200 may transmit and receive a wireless signal through a variety of radio access technologies (e.g., LTE, NR).

A first wireless device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts disclosed in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts disclosed in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second wireless device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts disclosed in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts disclosed in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a wireless device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts disclosed in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts disclosed in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts disclosed in the present disclosure may be implemented by using a firmware or a software and a firmware or a software may be implemented to include a module, a procedure, a function, etc. A firmware or a software configured to perform description, functions, procedures, proposals, methods and/or operation flow charts disclosed in the present disclosure may be included in one or more processors 102, 202 or may be stored in one or more memories 104, 204 and driven by one or more processors 102, 202. Description, functions, procedures, proposals, methods and/or operation flow charts disclosed in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. disclosed in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. disclosed in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefor, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other non-volatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a wireless device 100, 200 of the present disclosure may include Narrowband Internet of Things for a low-power communication as well as LTE, NR and 6G. Here, for example, an NB-IoT technology may be an example of a LPWAN (Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN (personal area networks) related to a small/low-power digital communication based on a variety of standards such as IEEE 802.15.4, etc. and may be referred to as a variety of names.

A method proposed by the present disclosure is mainly described based on an example applied to 3GPP LTE/LTE-A, 5G system, but may be applied to various wireless communication systems other than the 3GPP LTE/LTE-A, 5G system.

What is claimed is:

1. A method comprising:

receiving, by a terminal, from a base station, downlink control information for scheduling a physical uplink shared channel and triggering transmission of an aperiodic sounding reference signal; and transmitting, to the base station, the physical uplink shared channel and the aperiodic sounding reference signal based on the downlink control information, wherein the downlink control information includes frequency resource allocation information for transmission of the physical uplink shared channel, and wherein a transmission bandwidth of the aperiodic sounding reference signal is determined based on a frequency resource allocated by the frequency resource allocation information and a frequency resource allocation type for the physical uplink shared channel.

2. The method of claim 1, wherein based on the frequency resource allocation type for the physical uplink shared channel being uplink resource allocation type 0, the transmission bandwidth of the aperiodic sounding reference signal is determined as a contiguous bandwidth including the lowest resource block group and the highest resource block group for transmission of the physical uplink shared channel.

3. The method of claim 1, wherein based on the frequency resource allocation type for the physical uplink shared channel being uplink resource allocation type 0, the transmission bandwidth of the aperiodic sounding reference signal is determined as a contiguous bandwidth including all resource block groups except for one or more resource block groups allocated for transmission of the physical uplink shared channel.

4. The method of claim 1, wherein based on the frequency resource allocation type for the physical uplink shared channel being uplink resource allocation type 0, the transmission bandwidth of the aperiodic sounding reference signal is determined as a contiguous bandwidth including all contiguous resource block groups having the largest bandwidth among resource block groups excluding one or more resource block groups allocated for transmission of the physical uplink shared channel.

5. The method of claim 1, wherein based on the frequency resource allocation type for the physical uplink shared channel being uplink resource allocation type 1, the transmission bandwidth of the aperiodic sounding reference signal is determined as a contiguous bandwidth including all one or more contiguous resource blocks for transmission of the physical uplink shared channel.

6. The method of claim 1, wherein based on the frequency resource allocation type for the physical uplink shared channel being uplink resource allocation type 1, the transmission bandwidth of the aperiodic sounding reference signal is determined as a contiguous bandwidth including all resource blocks except for one or more resource blocks allocated for transmission of the physical uplink shared channel.

7. The method of claim 1, wherein based on the frequency resource allocation type for the physical uplink shared channel being uplink resource allocation type 1, the transmission bandwidth of the aperiodic sounding reference signal is determined as a contiguous bandwidth including all contiguous resource blocks having the largest bandwidth among resource blocks excluding one or more resource blocks allocated for transmission of the physical uplink shared channel.

8. The method of claim 1, wherein based on the frequency resource allocation type for the physical uplink shared channel being uplink resource allocation type 2, the transmission bandwidth of the aperiodic sounding reference signal is determined as a contiguous bandwidth including all one or more resource block sets allocated for transmission of the physical uplink shared channel.

9. The method of claim 1, wherein based on the frequency resource allocation type for the physical uplink shared channel being uplink resource allocation type 2, the transmission bandwidth of the aperiodic sounding reference signal is determined as one or more resource block sets indicated by the downlink control information among one or more resource block sets allocated for transmission of the physical uplink shared channel.

10. The method of claim 1, wherein based on the frequency resource allocation type for the physical uplink shared channel being uplink resource allocation type 2, the transmission bandwidth of the aperiodic sounding reference signal is determined by one or more resource block sets for transmission of the physical uplink shared channel.

11. The method of claim 10, wherein when the physical uplink shared channel and the aperiodic sounding reference signal are transmitted in the same slot or an adjacent slot, and/or a bandwidth configured for the aperiodic sounding reference signal is greater than one or more resource block sets for transmission of the physical uplink shared channel, the transmission bandwidth of the aperiodic sounding reference signal is determined by one or more resource block sets for transmission of the physical uplink shared channel.

12. The method of claim 11, wherein a listen before talk (LBT) operation is performed in a bandwidth corresponding to one or more resource block sets for transmission of the physical uplink shared channel, and when the LBT operation fails, the LBT operation is re-performed in a bandwidth configured for the aperiodic sounding reference signal.

13. The method of claim 1, wherein the downlink control information includes time resource allocation information for transmission of the physical uplink shared channel, and wherein the aperiodic sounding reference signal is transmitted in a slot allocated by the time resource allocation information.

14. The method of claim 1, wherein whether the transmission bandwidth of the aperiodic sounding reference signal is determined based on the frequency resource allocated by the frequency resource allocation information and the frequency resource allocation type is configured by the downlink control information or higher layer signaling.

15. A terminal comprising:
at least one transceiver for transmitting and receiving a wireless signal; and
at least one processor for controlling the at least one transceiver,
wherein the at least one processor configured to:
receive, from a base station, downlink control information for scheduling a physical uplink shared channel and triggering transmission of an aperiodic sounding reference signal; and
transmit, to the base station, the physical uplink shared channel and the aperiodic sounding reference signal based on the downlink control information,
wherein the downlink control information includes frequency resource allocation information for transmission of the physical uplink shared channel, and
wherein a transmission bandwidth of the aperiodic sounding reference signal is determined based on a frequency resource allocated by the frequency resource allocation information for transmission of the physical uplink shared channel and a frequency resource allocation type for the physical uplink shared channel.

16. At least one non-transitory computer-readable medium storing at least one instruction, wherein the at least one instruction is executable by at least one processor controls a device to:
receive, from a base station, downlink control information for scheduling a physical uplink shared channel and triggering transmission of an aperiodic sounding reference signal; and
transmit, to the base station, the physical uplink shared channel and the aperiodic sounding reference signal based on the downlink control information,

wherein the downlink control information includes frequency resource allocation information for transmission of the physical uplink shared channel, and wherein a transmission bandwidth of the aperiodic sounding reference signal is determined based on a frequency resource allocated by the frequency resource allocation information and a frequency resource allocation type for the physical uplink shared channel.

\* \* \* \* \*